(12) United States Patent
Zhou et al.

(10) Patent No.: US 12,557,158 B2
(45) Date of Patent: Feb. 17, 2026

(54) MULTI-PATH USER EQUIPMENT UPLINK COMMUNICATION TECHNIQUES WITH USER EQUIPMENT COOPERATION

(71) Applicant: QUALCOMM Incorporated, San Diego, CA (US)

(72) Inventors: Shanyu Zhou, San Diego, CA (US); Jelena Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 640 days.

(21) Appl. No.: 18/046,307

(22) Filed: Oct. 13, 2022

(65) Prior Publication Data

US 2024/0129975 A1    Apr. 18, 2024

(51) Int. Cl.
*H04W 76/15* (2018.01)
*H04W 76/14* (2018.01)
*H04W 92/10* (2009.01)

(52) U.S. Cl.
CPC ........... *H04W 76/15* (2018.02); *H04W 76/14* (2018.02); *H04W 92/10* (2013.01)

(58) Field of Classification Search
CPC ..... H04W 76/10; H04W 76/15; H04W 76/14; H04W 40/22; H04W 92/18; H04W 92/10; H04B 7/155
See application file for complete search history.

(56) References Cited

U.S. PATENT DOCUMENTS

| | | | |
|---|---|---|---|
| 2018/0123683 A1* | 5/2018 | Wakabayashi | H04W 40/22 |
| 2018/0206290 A1 | 7/2018 | Dai | |
| 2019/0215685 A1* | 7/2019 | Wang | H04W 80/02 |
| 2021/0136786 A1 | 5/2021 | Fong et al. | |
| 2021/0144800 A1 | 5/2021 | Akkarakaran et al. | |
| 2022/0278891 A1 | 9/2022 | Damnjanovic et al. | |
| 2022/0346163 A1* | 10/2022 | Damnjanovic | H04W 76/15 |
| 2023/0139318 A1* | 5/2023 | Zhang | H04W 28/0236 370/329 |
| 2023/0199614 A1* | 6/2023 | Wang | H04W 40/12 370/315 |
| 2023/0319880 A1* | 10/2023 | Li | H04W 74/0808 370/329 |

(Continued)

OTHER PUBLICATIONS

International Search Report and Written Opinion—PCT/US2023/073175—ISA/EPO—Dec. 18, 2023 (2207836WO).

(Continued)

*Primary Examiner* — Congvan Tran
(74) *Attorney, Agent, or Firm* — Norton Rose Fulbright US LLP

(57) ABSTRACT

This disclosure provides systems, methods, and devices for wireless communication that support multi-path user equipment (UE) uplink communication techniques with UE cooperation. In a first aspect, a UE configured for wireless communication includes determining activation of a multipath transmission configuration at the UE. The UE identifies one or more uplink communication messages for transmission to the serving network entity and transmits the uplink communication messages according to the multipath transmission configuration. Other aspects and features are also claimed and described with respect to cooperative UEs and network entities.

17 Claims, 9 Drawing Sheets

(56) References Cited

U.S. PATENT DOCUMENTS

2023/0354152 A1* 11/2023 Bangolae .............. H04W 40/22
2025/0024334 A1* 1/2025 Lu ......................... H04W 76/14

OTHER PUBLICATIONS

Samsung: "(TP to TS38.401 on SL Relay) Discussion on Multipath for Sidelink Relay", 3GPP TSG-RAN WG3 #117-e, R3-224831, 3Rd Generation, PartnerShip Project (3GPP), Mobile Competence Centre ; 650, Route Des Lucioles ; F-06921 Sophia-antipolis Cedex; France, vol. RAN WG3, No. Aug. 15, 2022-Aug. 24, 2022 Aug. 9, 2022, XP052264998, Aug. 15-Aug. 24, 2022, 9 Pages.

* cited by examiner

MULTI-PATH USER EQUIPMENT UPLINK COMMUNICATION TECHNIQUES WITH USER EQUIPMENT COOPERATION

TECHNICAL FIELD

Aspects of the present disclosure relate generally to wireless communication systems, and more particularly, to multi-path communications with user equipment (UE) cooperation. Some features may enable and provide improved communications, including multi-path UE uplink communication techniques with UE cooperation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A network entity may transmit data and control information on a downlink to a UE or may receive data and control information on an uplink from the UE. On the downlink, a transmission from the network entity may encounter interference due to transmissions from neighbor network entities or from other wireless radio frequency (RF) transmitters. On the uplink, a transmission from the UE may encounter interference from uplink transmissions of other UEs communicating with the neighbor network entities or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes determining activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity, identifying one or more uplink communication messages for transmission to the serving network entity, and transmitting the one or more uplink communication messages to the serving network entity according to the multipath transmission configuration, wherein the one or more uplink communication messages are transmitted one of separately or assembled into one or more joint uplink communication messages.

In an additional aspect of the disclosure, a method for wireless communication includes receiving an activation indication of a multipath transmission configuration from a primary UE in sidelink communications with the cooperative UE, wherein the multipath transmission configuration defines retransmission of uplink communications received from the primary UE via a sidelink interface to a serving network entity via a direct air interface between the cooperative UE and the serving network entity, receiving one or more uplink communication messages from the primary UE, and retransmitting the one or more uplink communication messages to the serving network entity via the direct air interface according to the multipath transmission configuration.

In an additional aspect of the disclosure, a method for wireless communication includes transmitting an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, identifying one or more duplicate uplink communication messages from a two or more uplink communication messages received at the network entity, and discarding the one or more duplicate uplink communication messages.

In an additional aspect of the disclosure, an apparatus includes at least one processor and a memory coupled to the at least one processor. The at least one processor is configured to determine activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity, to identify one or more uplink communication messages for transmission to the serving network entity, and to transmit the one or more uplink communication messages to the serving network entity according to the multipath transmission configuration, wherein the one or more uplink communication messages are transmitted one of separately or assembled into one or more joint uplink communication messages.

In an additional aspect of the disclosure, an apparatus includes at least one processor and a memory coupled to the at least one processor. The at least one processor is configured to receive an activation indication of a multipath transmission configuration from a primary UE in sidelink communications with the cooperative UE, wherein the multipath transmission configuration defines retransmission of uplink communications received from the primary UE via a sidelink interface to a serving network entity via a direct air interface between the cooperative UE and the serving network entity, to receive one or more uplink communication messages from the primary UE, and to retransmit the one or more uplink communication messages to the serving network entity via the direct air interface according to the multipath transmission configuration.

In an additional aspect of the disclosure, an apparatus includes at least one processor and a memory coupled to the at least one processor. The at least one processor is configured to transmit an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, to identify one or more duplicate uplink communication messages from a two or more uplink communication messages received at the network entity, and to discard the one or more duplicate uplink communication messages.

In an additional aspect of the disclosure, an apparatus includes means for determining activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity, means for identifying one or more uplink communication messages for transmission to the serving network entity, and means for transmitting the one or more uplink communication messages to the serving network entity according to the multipath transmission configuration, wherein the one or more uplink communication messages are transmitted one of separately or assembled into one or more joint uplink communication messages.

In an additional aspect of the disclosure, an apparatus includes means for receiving an activation indication of a multipath transmission configuration from a primary UE in sidelink communications with the cooperative UE, wherein the multipath transmission configuration defines retransmission of uplink communications received from the primary UE via a sidelink interface to a serving network entity via a direct air interface between the cooperative UE and the serving network entity, means for receiving one or more uplink communication messages from the primary UE, and means for retransmitting the one or more uplink communication messages to the serving network entity via the direct air interface according to the multipath transmission configuration.

In an additional aspect of the disclosure, an apparatus includes means for transmitting an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, means for identifying one or more duplicate uplink communication messages from a two or more uplink communication messages received at the network entity, and means for discarding the one or more duplicate uplink communication messages.

In an additional aspect of the disclosure, a non-transitory computer-readable medium stores instructions that, when executed by a processor, cause the processor to perform operations. The operations include determining activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity, identifying one or more uplink communication messages for transmission to the serving network entity, and transmitting the one or more uplink communication messages to the serving network entity according to the multipath transmission configuration, wherein the one or more uplink communication messages are transmitted one of separately or assembled into one or more joint uplink communication messages.

In an additional aspect of the disclosure, a non-transitory computer-readable medium stores instructions that, when executed by a processor, cause the processor to perform operations. The operations include receiving an activation indication of a multipath transmission configuration from a primary UE in sidelink communications with the cooperative UE, wherein the multipath transmission configuration defines retransmission of uplink communications received from the primary UE via a sidelink interface to a serving network entity via a direct air interface between the cooperative UE and the serving network entity, receiving one or more uplink communication messages from the primary UE, and retransmitting the one or more uplink communication messages to the serving network entity via the direct air interface according to the multipath transmission configuration.

In an additional aspect of the disclosure, a non-transitory computer-readable medium stores instructions that, when executed by a processor, cause the processor to perform operations. The operations include transmitting an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, identifying one or more duplicate uplink communication messages from a two or more uplink communication messages received at the network entity, and discarding the one or more duplicate uplink communication messages.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
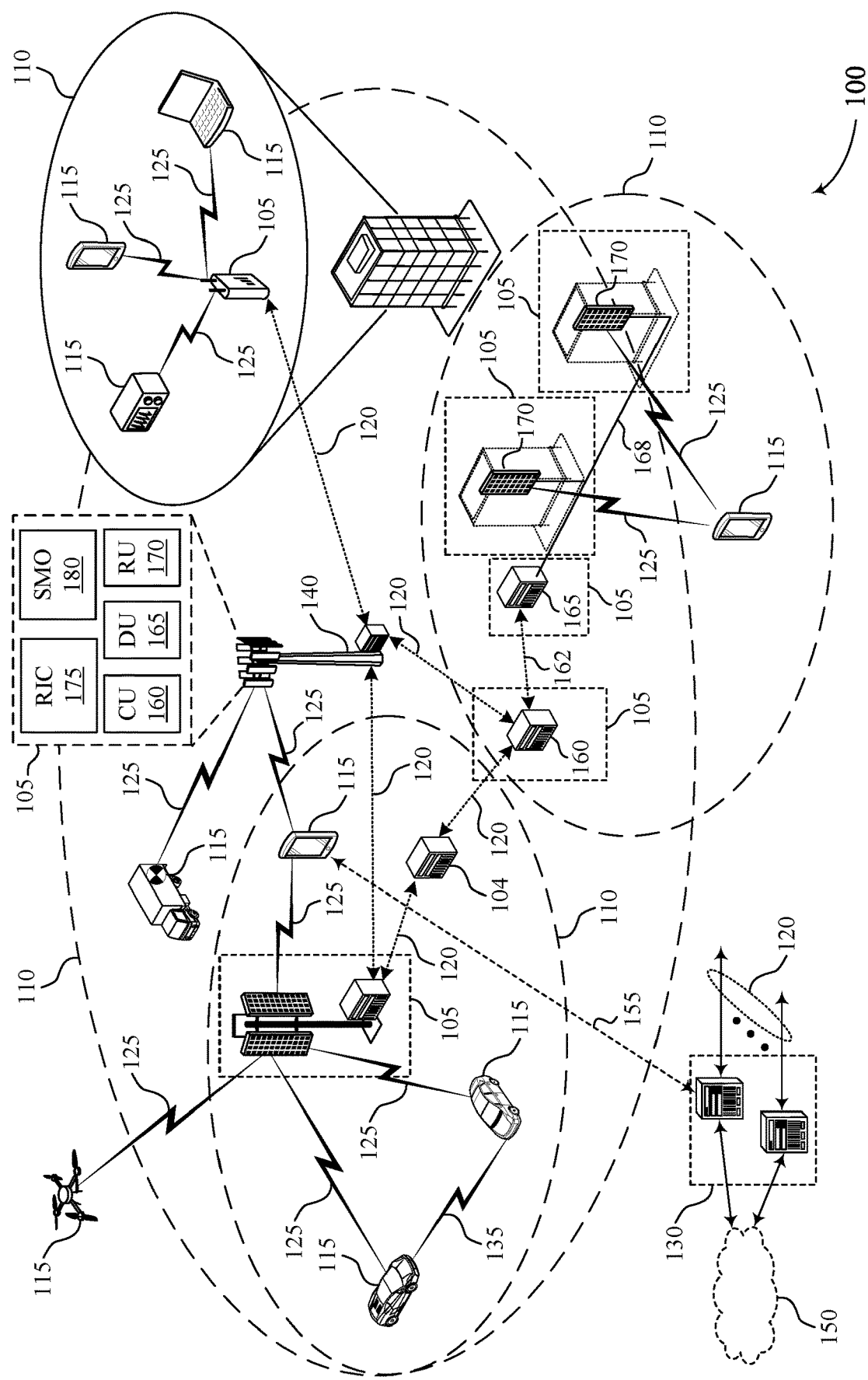
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support multi-path user equipment (UE) uplink communication techniques with UE cooperation. Particular implementations of the subject matter described in this disclosure may be implemented to realize one or more of the following potential advantages or benefits. In some aspects, the present disclosure provides techniques for multi-path UE uplink communication techniques with UE cooperation. The multi-path UE uplink communication according to the present aspects may reduce latency and power consumption in response to the potential reduction of retransmissions. By increasing the reliability of the uplink communications, quality of service, beam reliability, and resource utilization may all be improved.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.126 GHz-24.25 GHz). Frequency bands falling within FR3 may inherit FR1 characteristics and/or FR2 characteristics, and, thus, may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2x (52.6 GHz-71 GHz), FR4 (71 GHz-114.25 GHz), and FR5 (114.25 GHz-275 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmW" or the like if used herein may broadly represent frequencies that may include mid-band frequencies, may be within FR2, FR2x, FR4, and/or FR5, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmW transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmW components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 illustrates an example of a wireless communications system 100 that supports scheduling requests for spatial multiplexing in accordance with one or more aspects of the present disclosure. Wireless communications system 100 may include one or more network entities 105, one or more UEs 115, and a core network 130. In some examples, wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

Network entities 105 may be dispersed throughout a geographic area to form wireless communications system 100 and may include devices in different forms or having different capabilities. In 3GPP, the term "cell" may refer to this particular geographic coverage area of a network entity, such as network entities 105, or a network entity subsystem serving the coverage area, depending on the context in which the term is used. In various examples, network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, network entity 105 may support a coverage area 110 (e.g., a geographic coverage area) over which UEs 115 and network entity 105 may establish one or more communication links 125. Coverage area 110 may be an example of a geographic area over which network entity 105 and UE 115 may support the communication of signals according to one or more radio access technologies (RATs).

UEs 115 may be dispersed throughout coverage area 110 of the wireless communications system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115 or network entities 105, as shown in FIG. 1.

As described herein, a node of wireless communications system 100, which may be referred to as a network node, or a wireless node, may be network entity 105 (e.g., any network entity described herein), UE 115 (e.g., any UE described herein), a network controller, an apparatus, a device, a computing system, one or more components, or another suitable processing entity configured to perform any of the techniques described herein. For example, a node may be UE 115. As another example, a node may be network entity 105. As another example, a first node may be configured to communicate with a second node or a third node. In one aspect of this example, the first node may be UE 115, the second node may be network entity 105, and the third node may be UE 115. In another aspect of this example, the first node may be UE 115, the second node may be network entity 105, and the third node may be network entity 105. In yet other aspects of this example, the first, second, and third nodes may be different relative to these examples. Similarly, reference to UE 115, network entity 105, apparatus, device, computing system, or the like may include disclosure of UE 115, network entity 105, apparatus, device, computing system, or the like being a node. For example, disclosure that UE 115 is configured to receive information from network entity 105 also discloses that a first node is configured to receive information from a second node.

In some examples, network entities 105 may communicate with core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over backhaul communication link 120 (e.g., in accordance with an X2, Xn, or other interface protocol) either directly (e.g., directly between network entities 105) or indirectly (e.g., via core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. Backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. UE 115 may communicate with core network 130 through a communication link 155.

One or more of network entities 105 described herein may include or may be referred to as base station 140 (e.g., a base transceiver station, a radio base station, an NR base station, an access point, a radio transceiver, a transmission-reception point (TRP), a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, network entity 105 (e.g., base station 140) may be implemented in an aggregated (e.g., monolithic, standalone) base station architecture, which may be configured to utilize a protocol stack that is physically or logically integrated within a single network entity 105 (e.g., a single RAN node, such as base station 140).

In some examples, network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. RU 170 may also be referred to as a radio head, a smart radio head, a remote radio head (RRH), a remote radio unit (RRU), or a transmission reception point (TRP). One or more components of network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between CU 160, DU 165, and RU 175 is flexible and may support different functionalities depending upon which functions (e.g., network layer functions, protocol layer functions, baseband functions, RF functions, and any combinations thereof) are performed at CU 160, DU 165, or RU 175. For example, a functional split of a protocol stack may be employed between CU 160 and DU 165 such that CU 160 may support one or more layers of the protocol stack and DU 165 may support one or more different layers of the protocol stack. In some examples, CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). CU 160 may be connected to one or more DUs 165 or RUs 170, and one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by CU 160.

Additionally, or alternatively, a functional split of the protocol stack may be employed between DU 165 and RU 170 such that DU 165 may support one or more layers of the protocol stack and RU 170 may support one or more different layers of the protocol stack. DU 165 may support one or multiple different cells (e.g., via one or more RUs 170). In some cases, a functional split between CU 160 and DU 165, or between DU 165 and RU 170 may be within a protocol layer (e.g., some functions for a protocol layer may be performed by one of CU 160, DU 165, or RU 170, while other functions of the protocol layer are performed by a different one of CU 160, DU 165, or RU 170). CU 160 may be functionally split further into CU control plane (CU-CP) and CU user plane (CU-UP) functions. CU 160 may be connected to one or more DUs 165 via midhaul communication link 162 (e.g., F1, F1-c, F1-u), and DU 165 may be connected to one or more RUs 170 via fronthaul communication link 168 (e.g., open fronthaul (FH) interface). In some examples, midhaul communication link 162 or fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of RU 170) of IAB node 104 used for access via DU 165 of IAB node 104 (e.g., referred to as virtual IAB-MT (vIAB-MT)). In some examples, IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between core network 130 and the AN (e.g., via a wired or wireless connection to core network 130). That is, an IAB donor may refer to a RAN node with a wired or wireless connection to core network 130. The IAB donor may include CU 160 and at least one DU 165 (e.g., and RU 170), in which case CU 160 may communicate with core network 130 over an interface (e.g., a backhaul link). IAB donor and IAB nodes 104 may communicate over an F1 interface according to a protocol that defines signaling messages (e.g., an F1 AP protocol). Additionally, or alternatively, CU 160 may communicate with the core network over an interface, which may be an example of a portion of backhaul link, and may communicate with other CUs 160 (e.g., CU 160 associated with an alternative IAB donor) over an Xn-C interface, which may be an example of a portion of a backhaul link.

IAB node 104 may refer to a RAN node that provides IAB functionality (e.g., access for UEs 115, wireless self-backhauling capabilities). DU 165 may act as a distributed scheduling node towards child nodes associated with IAB node 104, and the IAB-MT may act as a scheduled node towards parent nodes associated with IAB node 104. That is, an IAB donor may be referred to as a parent node in communication with one or more child nodes (e.g., an IAB donor may relay transmissions for UEs through one or more other IAB nodes 104). Additionally, or alternatively, IAB node 104 may also be referred to as a parent node or a child node to other IAB nodes 104, depending on the relay chain or configuration of the AN. Therefore, the IAB-MT entity of IAB nodes 104 may provide a Uu-interface for a child IAB node 104 to receive signaling from parent IAB node 104, and the DU interface (e.g., DUs 165) may provide a Uu-interface for parent IAB node 104 to signal to child IAB node 104 or UE 115.

For example, IAB node 104 may be referred to as a parent node that supports communications for a child IAB node, and referred to as a child IAB node associated with an IAB donor. The IAB donor may include CU 160 with a wired or wireless connection (e.g., backhaul communication link 120) to core network 130 and may act as parent node to IAB nodes 104. For example, DU 165 of IAB donor may relay transmissions to UEs 115 through IAB nodes 104, and may directly signal transmissions to UE 115. CU 160 of IAB donor may signal communication link establishment via an F1 interface to IAB nodes 104, and IAB nodes 104 may schedule transmissions (e.g., transmissions to UEs 115 relayed from the IAB donor) through DUs 165. That is, data may be relayed to and from IAB nodes 104 via signaling over an NR Uu-interface to MT of IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support scheduling requests for spatial multiplexing as described herein. For example, some operations described as being performed by UE 115 or network entity 105 (e.g., base station 140) may additionally, or alternatively, be performed by one or more components of the disaggregated RAN architecture (e.g., IAB nodes 104, DUs 165, CUs 160, RUs 170, RIC 175, SMO 180).

UE 115 may include or may be referred to as a mobile device, a wireless device, a remote device, a handheld device, or a subscriber device, or some other suitable terminology, where the "device" may also be referred to as a unit, a station, a terminal, or a client, among other examples. UE 115 may also include or may be referred to as a personal electronic device such as a cellular phone, a personal digital assistant (PDA), a tablet computer, a laptop computer, or a personal computer. In some examples, UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, a satellite radio, a global positioning system (GPS) device, a global navigation satellite system (GNSS) device, a logistics controller, an unmanned aerial vehicle (UAV), a drone, a smart energy or security device, a solar panel or solar array, etc. among other examples.

UEs 115 described herein may be able to communicate with various types of devices, such as other UEs 115 that may sometimes act as relays as well as network entities 105 and the network equipment including macro eNBs or gNBs, small cell eNBs or gNBs, or relay base stations, among other examples, as shown in FIG. 1.

UEs 115 and network entities 105 may wirelessly communicate with one another via one or more communication links 125 (e.g., an access link) over one or more carriers. The term "carrier" may refer to a set of RF spectrum resources having a defined physical layer structure for supporting communication links 125. For example, a carrier used for communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communications system 100 may support communication with UE 115 using carrier aggregation or multi-carrier operation. UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between network entity 105 and other devices may refer to communication between the devices and any portion (e.g., entity, sub-entity) of network entity 105. For example, the terms "transmitting," "receiving," or "communicating," when referring to network entity 105, may refer to any portion of network entity 105 (e.g., base station 140, CU 160, DU 165, RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with UE 115.

One or more numerologies for a carrier may be supported, where a numerology may include a subcarrier spacing (Δf) and a cyclic prefix. A carrier may be divided into one or more BWPs having the same or different numerologies. In some examples, UE 115 may be configured with multiple BWPs. In some examples, a single BWP for a carrier may be active at a given time and communications for UE 115 may be restricted to one or more active BWPs.

The time intervals for network entities 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of UEs 115. For example, one or more of UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific one of UEs 115.

In some examples, network entity 105 (e.g., base station 140, RU 170) may be movable and therefore provide communication coverage for a moving one of coverage areas 110. In some examples, a different one of coverage areas 110 associated with different technologies may overlap, but the different one of coverage areas 110 may be supported by the same one of network entities 105. In some other examples, the overlapping coverage areas 110 associated with different technologies may be supported by different ones of network entities 105. Wireless communications system 100 may include, for example, a heterogeneous network in which different types of network entities 105 provide coverage for various coverage areas 110 using the same or different radio access technologies.

Some of UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or network entity 105 (e.g., base station 140) without human intervention. In some examples, M2M communication or MTC may include communications from devices that integrate sensors or meters to measure or capture information and relay such information to a central server or application program that makes use of the information or presents the information to humans interacting with the application program. Some of UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some of UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some of UEs 115 may be configured for operation using a narrowband protocol type that is associated with a defined portion or range (e.g., set of subcarriers or resource blocks (RBs)) within a carrier, within a guard-band of a carrier, or outside of a carrier.

Wireless communications system 100 may be configured to support ultra-reliable communications or low-latency communications, or various combinations thereof. For example, wireless communications system 100 may be configured to support ultra-reliable low-latency communications (URLLC). UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within coverage area 110 of network entity 105 (e.g., base station 140, RU 170), which may support aspects of such D2D communications being configured by or scheduled by network entity 105. In some examples, one or more UEs 115 in such a group may be outside coverage area 110 of network entity 105 or may be otherwise unable to or not configured to receive transmissions from network entity 105. In some examples, groups of UEs 115 communicating via D2D communications may support a one-to-many (1:M) system in which each UE 115 transmits to each of the other ones of UEs 115 in the group. In some examples, network entity 105 may facilitate the scheduling of resources for D2D communications. In some other examples, D2D communications may be carried out between UEs 115 without the involvement of network entity 105.

In some systems, D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

Core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 served by network entities 105 (e.g., base stations 140) associated with core network 130. User IP packets may be transferred through the user plane entity, which may provide IP address allocation as well as other functions. The user plane entity may be connected to IP services 150 for one or more network operators. IP services 150 may include access to the Internet, Intranet(s), an IP Multimedia Subsystem (IMS), or a Packet-Switched Streaming Service.

Wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

Wireless communications system 100 may utilize both licensed and unlicensed RF spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as network entities 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

Network entity 105 (e.g., base station 140, RU 170) or UE 115 may be equipped with multiple antennas, which may be used to employ techniques such as transmit diversity, receive diversity, multiple-input multiple-output (MIMO) communications, or beamforming. The antennas of network entity 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with network entity 105 may be located in diverse geographic locations. Network entity 105 may have an antenna array with a set of rows and columns of antenna ports that network entity 105 may use to support beamforming of communications with UE 115. Likewise, UE 115 may have one or more antenna arrays that may support various MIMO or beamforming operations. Additionally, or alternatively, an antenna panel may support RF beamforming for a signal transmitted via an antenna port.

Network entities 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., network entity 105, UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Network entity 105 or UE 115 may use beam sweeping techniques as part of beamforming operations. For example, network entity 105 (e.g., base station 140, RU 170) may use multiple antennas or antenna arrays (e.g., antenna panels) to conduct beamforming operations for directional communications with UE 115. Some signals (e.g., synchronization signals, reference signals, beam selection signals, or other control signals) may be transmitted by network entity 105 multiple times along different directions. For example, network entity 105 may transmit a signal according to different beamforming weight sets associated with different directions of transmission. Transmissions along different beam directions may be used to identify (e.g., by a transmitting device, such as network entity 105, or by a receiving device, such as UE 115) a beam direction for later transmission or reception by network entity 105.

Some signals, such as data signals associated with a particular receiving device, may be transmitted by a transmitting device (e.g., transmitting network entity 105, transmitting UE 115) along a single beam direction (e.g., a direction associated with the receiving device, such as receiving network entity 105 or receiving UE 115). In some examples, the beam direction associated with transmissions along a single beam direction may be determined based on a signal that was transmitted along one or more beam directions. For example, UE 115 may receive one or more of the signals transmitted by network entity 105 along different directions and may report to network entity 105 an indication of the signal that UE 115 received with a highest signal quality or an otherwise acceptable signal quality.

In some examples, transmissions by a device (e.g., by network entity 105 or UE 115) may be performed using multiple beam directions, and the device may use a combination of digital precoding or beamforming to generate a combined beam for transmission (e.g., from network entity 105 to UE 115). The UE 115 may report feedback that indicates precoding weights for one or more beam directions, and the feedback may correspond to a configured set of beams across a system bandwidth or one or more subbands. Network entity 105 may transmit a reference signal (e.g., a cell-specific reference signal (CRS), a channel state information reference signal (CSI-RS)), which may be precoded or unprecoded. UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by network entity 105 (e.g., base station 140, RU 170), UE 115 may employ similar techniques for transmitting signals multiple times along different directions (e.g., for identifying a beam direction for subsequent transmission or reception by UE 115) or for transmitting a signal along a single direction (e.g., for transmitting data to a receiving device).

A receiving device (e.g., UE 115) may perform reception operations in accordance with multiple receive configurations (e.g., directional listening) when receiving various signals from a receiving device (e.g., network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between UE 115 and network entity 105 or core network 130 supporting radio bearers for user plane data. At the PHY layer, transport channels may be mapped to physical channels.

UEs 115 and network entities 105 may support retransmissions of data to increase the likelihood that data is received successfully. Hybrid automatic repeat request (HARQ) feedback is one technique for increasing the likelihood that data is received correctly over a communication link (e.g., communication link 125, D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

Figure 2:
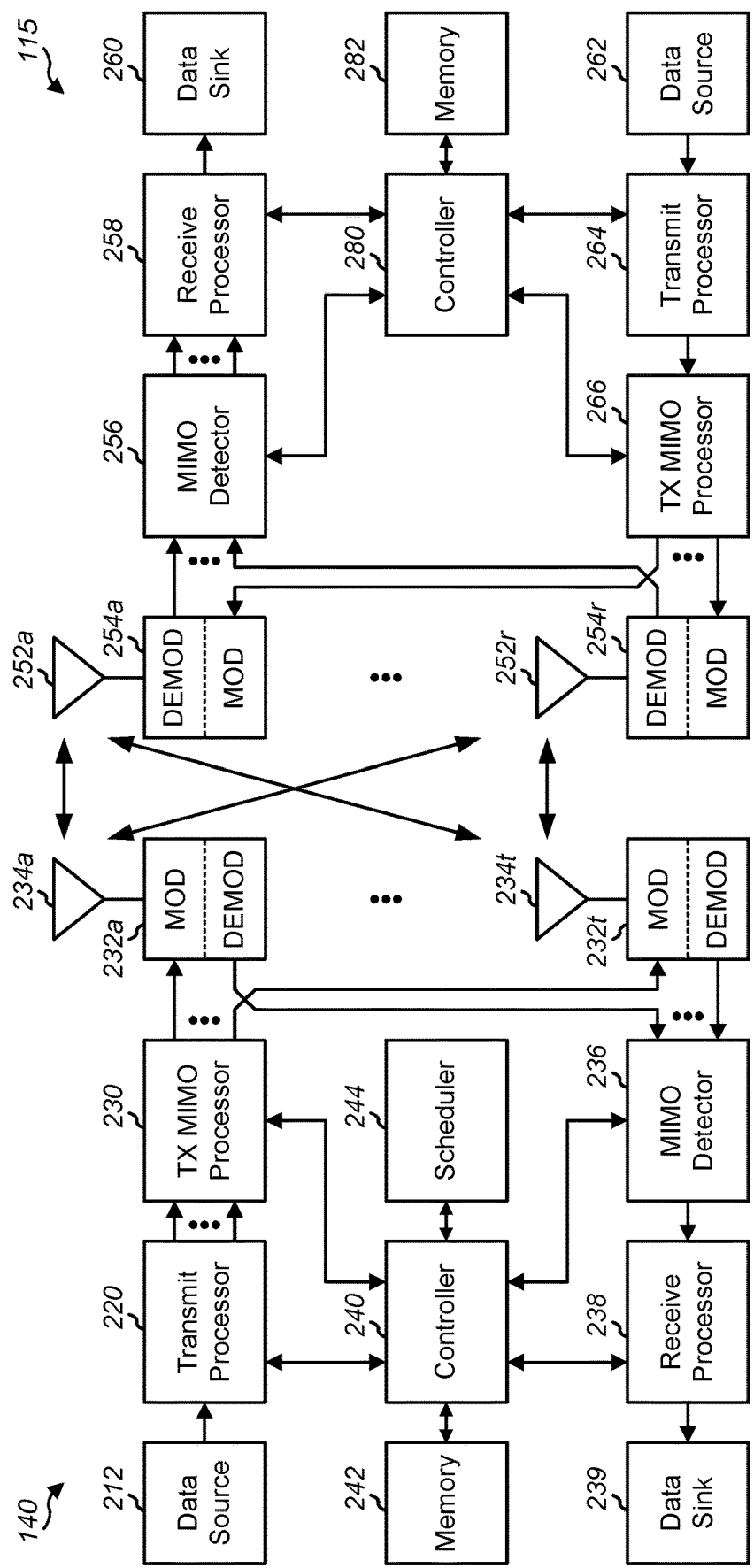
FIG. 2 is a block diagram illustrating examples of a base station and a user equipment (UE) capable of supporting multi-path user equipment (UE) uplink communication techniques with UE cooperation according to one or more aspects.

FIG. 2 is a block diagram illustrating examples of base station 140 and UE 115 according to one or more aspects. Base station 140 and UE 115 may be any of the network entities and base stations and one of the UEs in FIG. 1. For a restricted association scenario (as mentioned above), network entity 105 may be small cell base station, and UE 115 may be UE 115 operating in a service area of the small cell base station, which in order to access the small cell base station, would be included in a list of accessible UEs for the small cell base station. Base station 140 may also be a base station of some other type. As shown in FIG. 2, a network entity 105, such as base station 140 may be equipped with antennas 234a through 234t, and UE 115 may be equipped with antennas 252a through 252r for facilitating wireless communications.

At base station 140, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 140 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to network entity 105. At network entity 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 140 and UE 115, respectively. Controller 240 or other processors and modules at base station 140 or controller 280 or other processors and modules at UE 115 may perform or direct the execution of various processes for the techniques described herein, such as to perform or direct the execution illustrated in FIGS. 4A-4C, or other processes for the techniques described herein. Memories 242 and 282 may store data and program codes for base station 140 and UE 115, respectively. Scheduler 244 may schedule UEs for data transmission on the downlink or the uplink.

In some cases, UE 115 and base station 140 may operate in a shared radio frequency spectrum band, which may include licensed or unlicensed (e.g., contention-based) frequency spectrum. In an unlicensed frequency portion of the shared radio frequency spectrum band, UEs 115 or base station 140 may traditionally perform a medium-sensing procedure to contend for access to the frequency spectrum. For example, UE 115 or base station 140 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, a 16-µs, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Sensing for shared channel access may also be categorized into either full-blown or abbreviated types of LBT procedures. For example, a full LBT procedure, such as a CAT 3 or CAT 4 LBT procedure, including extended channel clearance assessment (ECCA) over a non-trivial number of 9-µs slots, may also be referred to as a "Type 1 LBT." An abbreviated LBT procedure, such as a CAT 2 LBT procedure, which may include a one-shot CCA for 16-µs or 25-µs, may also be referred to as a "Type 2 LBT."

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, network entities 105 and UEs 115 may be operated by the same or different network operating entities. In some examples, an individual network entity 105 or UE 115 may be operated by more than one network operating entity. In other examples, each network entity 105 and UE 115 may be operated by a single network operating entity. Requiring each network entity 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

Within general operations within a wireless cellular network, UEs may frequently conduct uplink communications whether those communications are data, control information, measurement or status reports, and the like. Measurement and status reports includes reports, such as buffer status reports (BSRs), power headroom reports (PHRs), beam failure recovery (BFR), and the like. These types of reports may typically be transmitted by the UE using medium access control-control element (MAC CE) type transmissions. In single path operations, a UE transmit uplink communications over a direct air interface, referred to as the Uu air interface, to a network entity. 5G NR 3GPP Release 18 (Rel-18) provides availability of multi-path communications, which enable a primary UE to be connected to both one or more cooperative UEs and the network entity gNB, where the uplink communications may be transmitted through the direct interface, Uu interface, and/or an indirect air interface or relay link. The various aspects of the present disclosure consider the multi-path communications between the primary UE and a network entity and propose techniques to facilitate primary UE uplink communications using both a direct air interface and one or more indirect air interfaces. Design consideration factors include options for multi-path UE uplink communications, network entity resolution when receiving duplicated reports from multiple paths, and configuration considerations.

Figure 3:
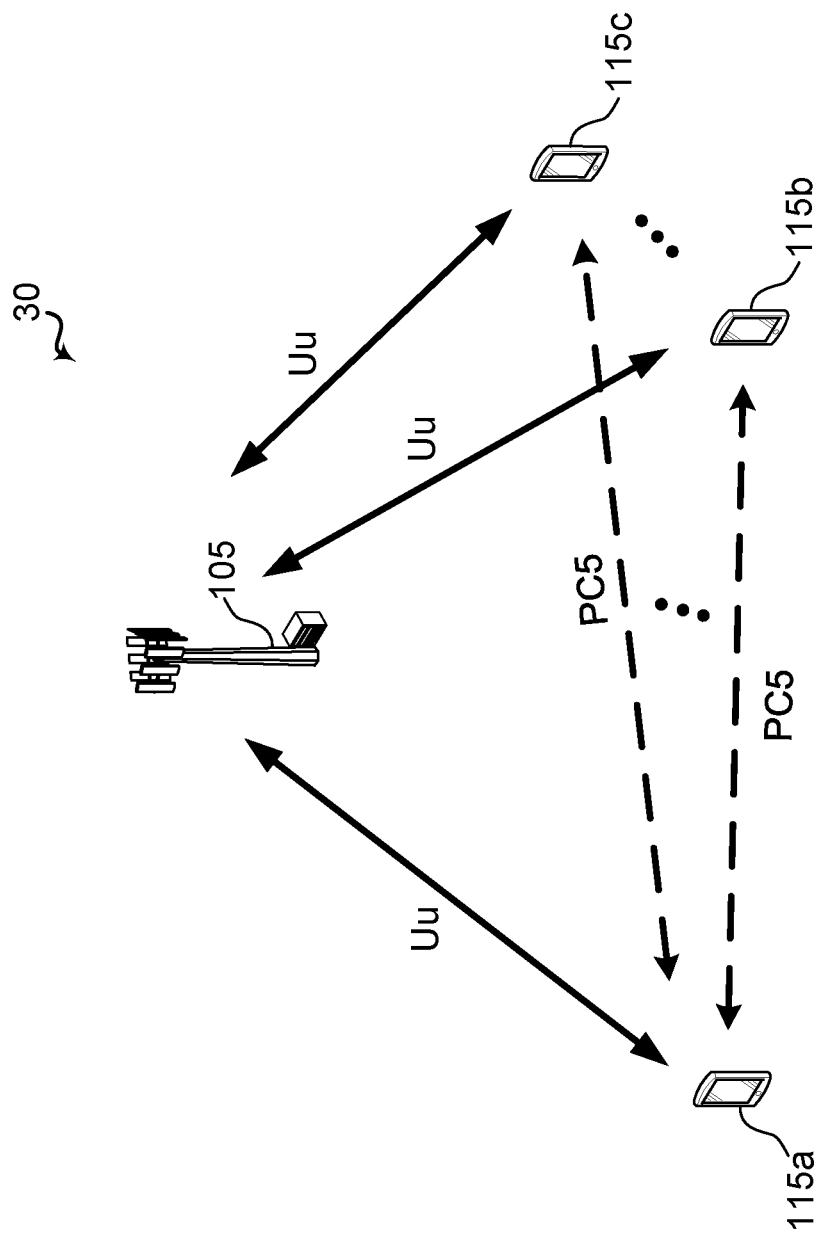
FIG. 3 is a block diagram illustrating a wireless network having a network entity, a primary UE, and at least two cooperative UEs, all such network nodes configured to support multi-path UE uplink communication techniques with UE cooperation according to one or more aspects of the present disclosure.

FIG. 3 is a block diagram illustrating a wireless network 30 having a network entity 105, a primary UE 115*a*, and at least two cooperative UEs 115*b* and 115*c*, all such network nodes configured to support multi-path UE uplink communication techniques with UE cooperation according to one or more aspects of the present disclosure. Primary UE 115*a* is in communication with network entity 105 via a direct air interface, Uu air interface, and in sidelink communications with cooperative UEs 115*b* and 115*c* via a sidelink air interface, such as PC5 interface. Cooperative UEs 115*b* and 115*c* are also in communication with network entity 105, each through its own direct air interface, Uu interface. Primary UE 115*a* and network entity 105 may communicate with either other via both the direct, Uu air interface, and via the indirect, relay links through cooperative UEs 115*b* and 115*c*. The indirect, relay links may include a combination of the sidelink air interfaces, PC5 interfaces, between primary UE 115*a* and each of cooperative UEs 115*b* and 115*c* and the direct air interfaces, Uu interfaces, between each of cooperative UEs 115*b* and 115*c* and network entity 105.

Figure 4A:
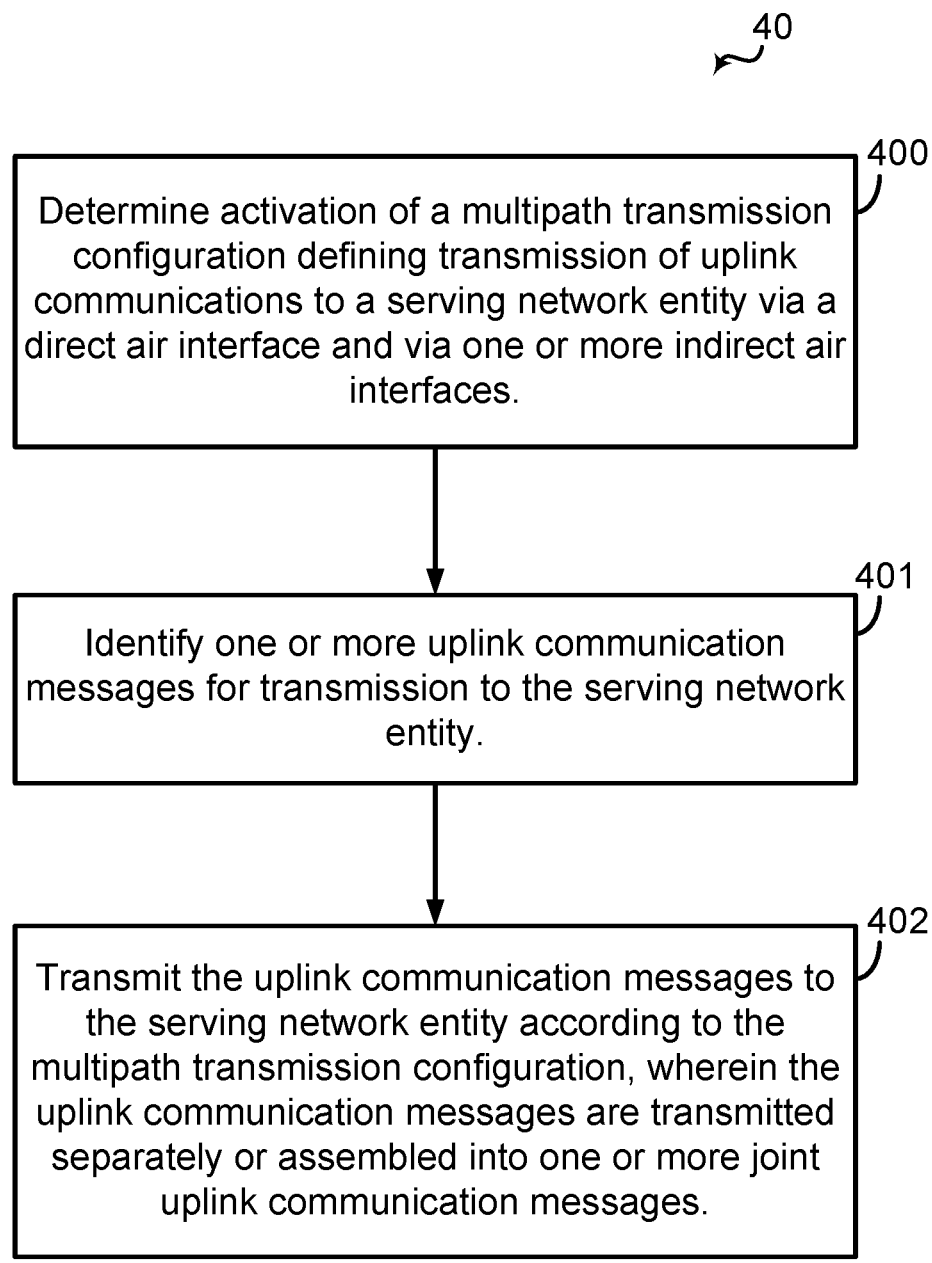
FIGS. 4A-4C are flow diagrams illustrating example processes that support multi-path UE uplink communication techniques with UE cooperation according to one or more aspects.
Figure 6:
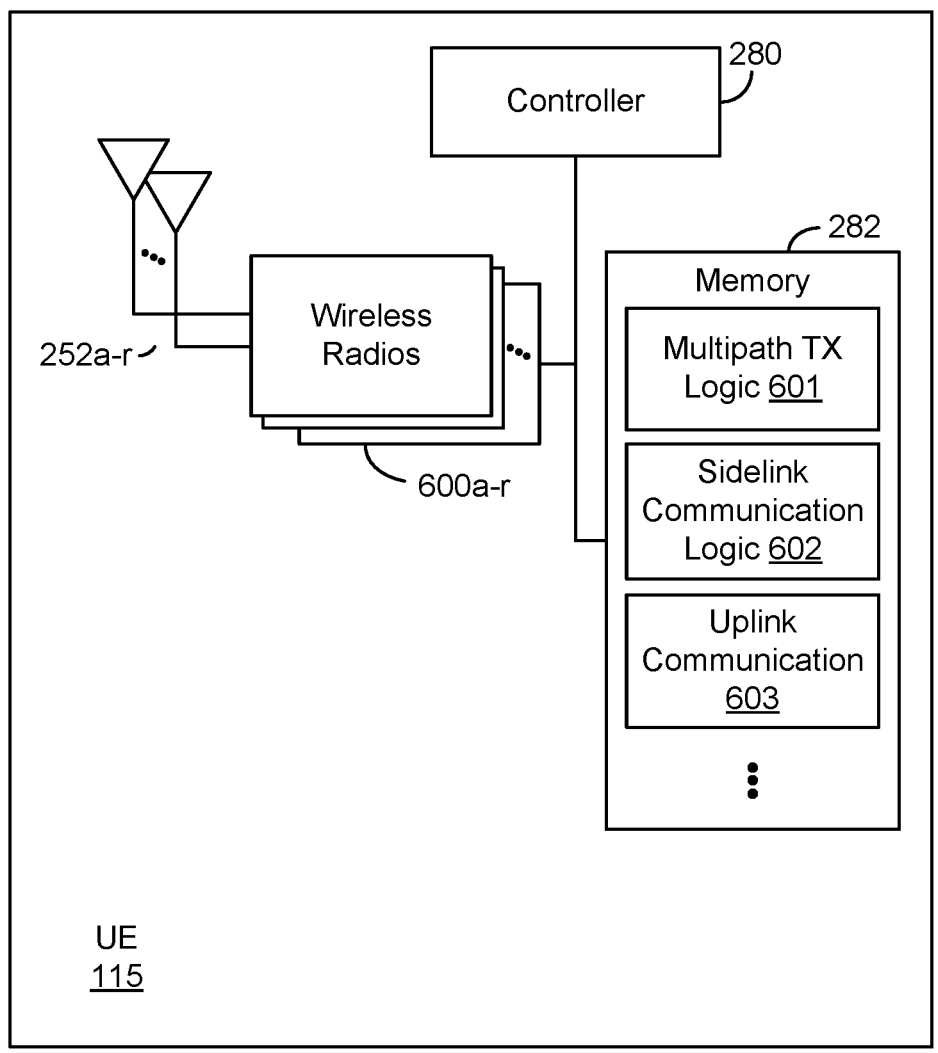
FIG. 6 is a block diagram of an example UE that supports multi-path UE uplink communication techniques with UE cooperation according to one or more aspects.

FIG. 4A is a flow diagram illustrating an example process 40 that supports multi-path UE uplink communication techniques with UE cooperation according to one or more aspects. Operations of process 40 may be performed by a UE, such as UE 115 described above with reference to FIGS. 1-3, or a UE described with reference to FIG. 6. FIG. 6 is a block diagram illustrating an example UE configured to support multi-path UE uplink communication techniques with UE cooperation according to one or more aspects. For example, example operations (also referred to as "blocks") of process 40 may enable UE 115 to support multi-path UE uplink communication techniques with UE cooperation.

As shown, memory 282 may include multipath transmission (TX) logic 601, sidelink communication logic 602, and uplink communication 603. Multipath TX logic 601 includes code and instructions that, when executed by controller 280 (referred to herein as the "execution environment" of multipath TX logic 601), enables UE 115 with the functionality and capabilities to conduct uplink communications via direct and indirect air interfaces with one or more cooperative UEs. Sidelink communication logic 602 includes code and instructions that, in its execution environment, enables UE 115 to perform sidelink communications with one or more neighboring UEs having sidelink or cooperative capabilities. Uplink communication 603 may include uplink data or logic for generating other uplink signals, including control signals, measurement reports, and the like.

In block 400, a UE determines activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity. A UE, such as UE 115, may determine activation of a multipath transmission configuration. This determination may occur because of an activation signal received from the network entity or by requesting the activation and receiving the activation signal, both via wireless radios 600*a-r* and antennas 252*a-r*. When the activation is determined, UE 115 may execute, under control of controller 280, multipath TX logic 601 and sidelink communication logic 602. The execution environment of sidelink communication logic 602 enables UE 115 to conduct sidelink communications with one or more cooperative UEs. The execution environment of multipath TX logic 601, when UE 115 detects an activation of a multipath transmission configuration, enables UE 115, operating as a primary UE, to configure uplink transmissions to occur both directly in a direct air interface between UE 115 and the network entity and indirectly via the sidelink air interfaces between UE 115 and the one or more cooperative UEs and the direct air interfaces between the one or more cooperative UEs and the network entity.

In block 401, the UE identifies one or more uplink communication messages for transmission to the serving network entity. UE 115 may access uplink communication 603, which may include either uplink data to be transmitted via network entity or an indication of an uplink control message, measurement report or the like.

In block 402, the UE transmits the one or more uplink communication messages to the serving network entity according to the multipath transmission configuration, wherein the one or more uplink communication messages are transmitted one of separately or assembled into one or more joint uplink communication messages. Within the execution environment of multipath TX logic 601, UE 115, as the primary UE transmits the uplink communications, from uplink communication 603, to each of the cooperative UEs and directly to the network entity via wireless radios 600*a-r* and antennas 252*a-r*. With the activated multipath transmission configuration, UE 115 would expect the cooperative UEs to retransmit such uplink communications to the network entity.

Figure 4B:
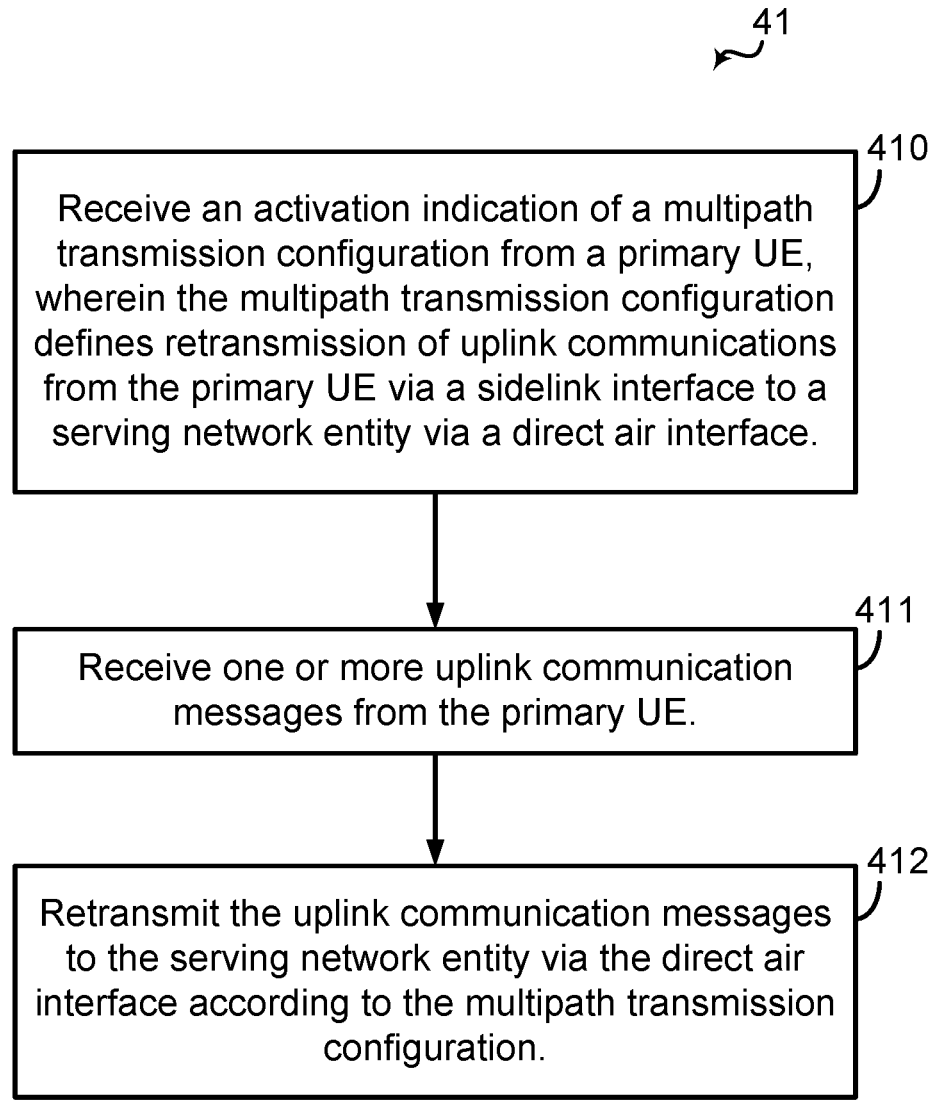

FIG. 4B is a flow diagram illustrating an example process 41 that supports multi-path UE uplink communication techniques with UE cooperation according to one or more aspects. Operations of process 41 may be performed by a UE, such as UE 115 described above with reference to FIGS. 1-3, or a UE described with reference to FIG. 6. FIG. 6 is a block diagram illustrating an example UE configured to support multi-path UE uplink communication techniques with UE cooperation according to one or more aspects. For example, example operations (also referred to as "blocks") of process 41 may enable UE 115 to support multi-path UE uplink communication techniques with UE cooperation.

In block 410, the UE receives an activation indication of a multipath transmission configuration from a primary UE in sidelink communications with the cooperative UE, wherein the multipath transmission configuration defines retransmission of uplink communications received from the primary UE via a sidelink interface to a serving network entity via a direct air interface between the cooperative UE and the serving network entity. A UE, such as UE 115, when operating as a cooperative UE in a group of cooperating UEs, may receive an activation indication from the primary UE in the group of UEs to activate a multipath transmission configuration via antennas 252*a-r* and wireless radios 600*a-r*. UE 115 operates within the group of cooperating UEs on execution, under control of controller 280, of sidelink communication logic 602. Within the execution environment of sidelink communication logic 602, UE 115 may send and receive sidelink communications from one or more cooperative UEs in the group. In response to the activation indication, UE 115 may execute, under control of controller 280, multipath TX logic 601.

In block 411, the UE receives one or more uplink communication messages from the primary UE. UE 115 may receive uplink communication messages from the primary UE through sidelink communications via antennas 252*a-r* and wireless radios 600*a-r*.

In block 412, the UE retransmits the one or more uplink communication messages to the serving network entity via the direct air interface according to the multipath transmission configuration. Within the execution environment of multipath TX logic 601, UE 115, as a cooperative UE, is configured to identify the uplink communication messages received from the primary UE via sidelink communications and retransmit those uplink communications to the network entity via wireless radios 600*a-r* and antennas 252*a-r*.

Figure 4C:
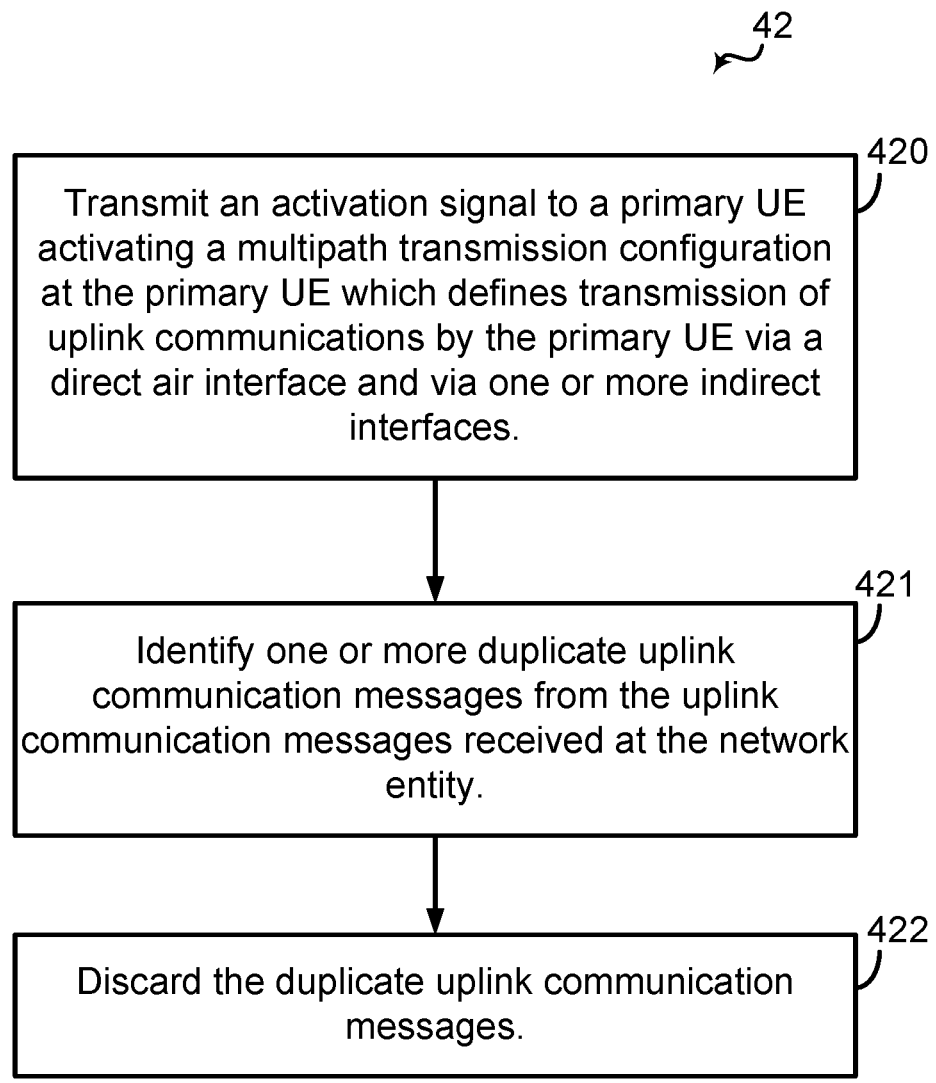
Figure 7:
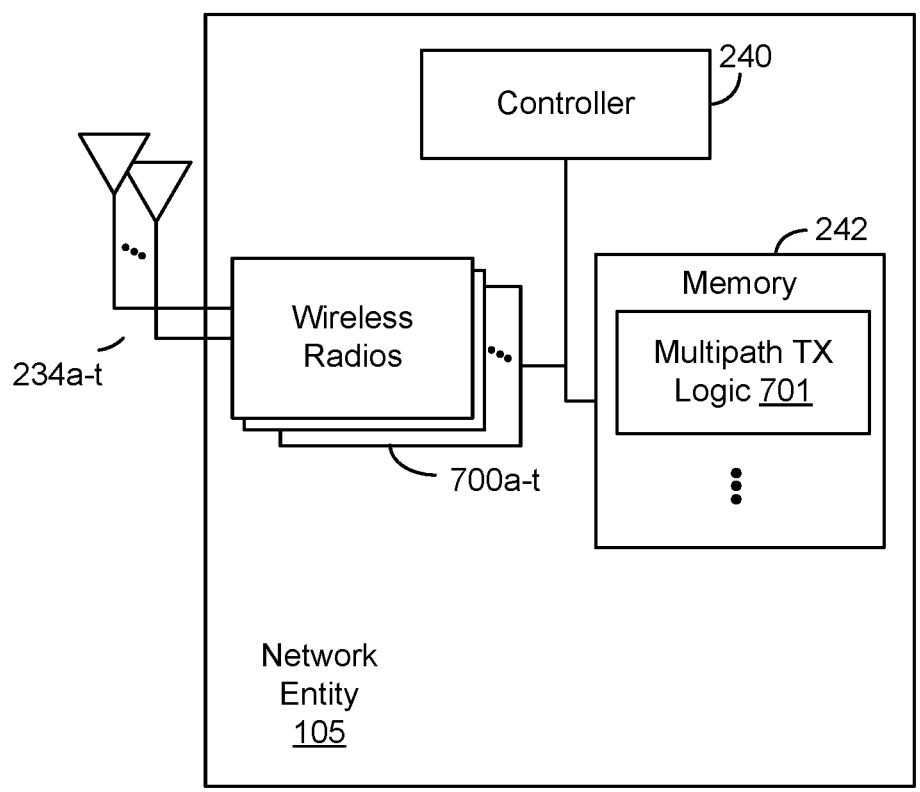
FIG. 7 is a block diagram of an example base station that supports multi-path UE uplink communication techniques with UE cooperation according to one or more aspects.

FIG. 4C is a flow diagram illustrating an example process 42 that supports multi-path UE uplink communication techniques with UE cooperation according to one or more aspects. Operations of process 42 may be performed by a network entity, such as network entity 105, base station 140, and the like, described above with reference to FIGS. 1-3, or a network entity described with reference to FIG. 7. FIG. 7 is a block diagram illustrating an example network entity configured to support multi-path UE uplink communication techniques with UE cooperation according to one or more aspects. For example, example operations (also referred to as "blocks") of process 42 may enable network entity 105 to support multi-path UE uplink communication techniques with UE cooperation.

As shown, memory 242 may include multipath TX logic 701. Multipath TX logic 701 includes code and instructions that, when executed by controller 240, enables network entity 105 with the functionality and capabilities to manage a multipath transmission operation with multiple served UEs.

In block 420, the network entity transmits an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity. A network entity, such as network entity 105, may determine activation of a multipath transmission configuration for a served UE. This determination may occur because network entity 105 determines the communication environment may benefit from the UE using a multipath transmission configuration or may receive a request for the activation from the served UE via wireless radios 700a-t and antennas 234a-t. When the activation is determined, network entity 105 may execute, under control of controller 240, multipath TX logic 701. The execution environment of multipath TX logic 701, when network entity 105 determines activation of the multipath transmission configuration, enables network entity 105 to transmit an activation signal to the served UE via wireless radios 700a-t and antennas 234a-t.

In block 421, the network entity identifies one or more duplicate uplink communication messages from a two or more uplink communication messages received at the network entity. As network entity 105 receives uplink communications from served UEs via antennas 234a-t and wireless radios 700a-t, it may, within the execution environment of multipath TX logic 701, determine which of those uplink communications may be duplicate communications received via the multipath transmission configuration. For example, network entity 105 may decode the report identifier (ID) of the message to determine the duplicate communications.

In block 422, the network entity discards the one or more duplicate uplink communication messages. Within the execution environment of multipath TX logic 701, network entity 105 would discard the duplicate communications, whether received simultaneously with the other communication or after receiving the other communication.

As described with reference to FIGS. 4A-4C, the present disclosure provides techniques for multi-path UE uplink communication techniques with UE cooperation. The multi-path UE uplink communication according to the present aspects may reduce latency and power consumption in response to the potential reduction of retransmissions. By increasing the reliability of the uplink communications, quality of service, beam reliability, and resource utilization may all be improved.

Referring back to FIG. 3, a UE, such as primary UE 115a, may be configured or have the capabilities to transmit uplink communications using a multi-path transmission configuration. Primary UE 115a may receive a configuration message from network entity 105 which activates the multi-path transmission configuration at primary UE 115a, or primary UE 115a may, autonomously, determine to activate the multi-path transmission configuration. The uplink communications that primary UE 115a may transmit using the direct and indirect air interfaces of the multi-path transmission configuration may include all expected uplink transmissions, including control signaling, report transmissions, and even data transmissions. Depending on the size of the expected payload, the multi-path transmissions maybe formatted according to different types of transmission formats, such as uplink control information (UCI) formatted messages, medium access control-control element (MAC CE) formatted messages, and the like. For example, where the payload size is smaller, such as one bit or a few bits (e.g., a "not empty indicator" for BSR report), primary UE 115a may format the uplink communications using UCI messaging, while if the payload is expected to be larger than a few bits (e.g., a BSR report including the uplink buffer data priority information, deadline information, channel measurements, etc.), primary UE 115a may format the uplink communications using MAC CE messaging.

The uplink communications that may be transmitted within the multi-path transmission configuration may be transmitted separately, such as each individual report (e.g., BSR, beam failure recovery (BFR) report, power headroom report (PHR), ultra-reliable low-latency communications (URLLC) data, etc.) being transmitted independently using the multi-path configuration, or jointly, in which certain transmissions or reports are combined into a joint message (e.g., BHR+PHR, PHR+URLLC, PHR+BFR, etc.). Each separate or joint uplink communication may then be transmitted to network entity 105 via the direct air interface, Uu air interface, between primary UE 115a and network entity 105, and via the indirect air interfaces, the sidelink interfaces, PC5 interfaces, between primary UE 115a and cooperative UEs 115b and 115c, in addition to the direct air interfaces, Uu air interfaces, between each of cooperative UEs 115b and 115c and network entity 105. Thus, the same uplink communication, whether separate or joint, is transmitted by primary UE 115a directly to network entity 105 and to each of cooperative UEs 115b and 115c, which retransmit or relay the uplink communications directly to network entity 105.

The various aspects of the present disclosure may provide for new message formatting that defines the joint message transmissions. When layer 1 (L1) signaling is used (e.g., UCI messaging), new UCI formats may be defined that are designed to identify and include the jointly combined communications into a single UCI message. When layer 2 (L2) signaling is used (e.g., MAC CE messaging), new MAC CE formats may be designed to identify and include the jointly combined messages into a single MAC CE message, whether a new L2 format specifically defines the certain combination of messages associated with the format or a new format defines indicator fields within the MAC CE message that delineates the different, combined messages within the MAC CE payload.

When the uplink communications include measurement reports or other types of control information or reports, such uplink communications may be reported by primary UE 115a on a periodic basis or an aperiodic basis. In a periodic reporting instance, network entity 105 may configured primary UE 115a with one or more periodicities, f, via control signaling (e.g., radio resource control (RRC) signaling) for transmitting these reporting uplink communications. Similarly, in an aperiodic reporting instance, network entity 105 may configured primary UE 115a with one or more triggering events via control signaling (e.g., RRC signaling) for triggering any of the aperiodic uplink communications. Triggering events may be related to channel conditions, UE mobility, reported contents, etc., that primary UE 115a experiences.

It should be noted that where multiple periodicities, f, or multiple triggering events are configured, network entity 105 may send more dynamic signaling (e.g., MAC CE, or downlink control information (DCI) messages) to indicate to primary UE 115a which periodicity, f, or which triggering event or set of triggering events to use when determining to transmit the associated reporting uplink communication. This configuration and selection messaging sequence allows network entity 105 and primary UE 115a to switch between different ones of the configured periodicities and triggering events.

Figure 5:
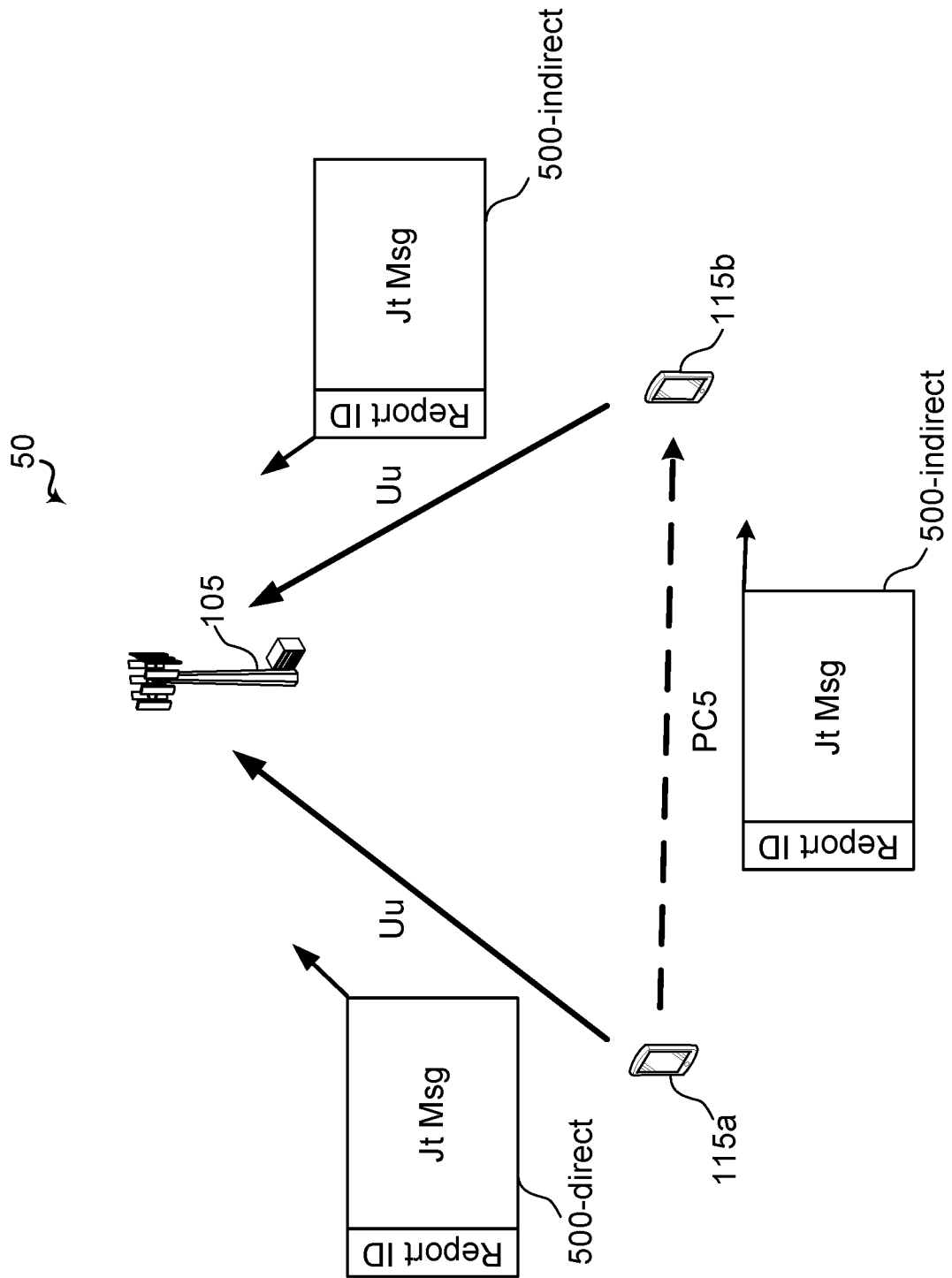
FIG. 5 is a block diagram illustrating a wireless network having a network entity, a primary UE, and a cooperative UE, all such network nodes configured to support multi-path UE uplink communication techniques with UE cooperation according to one or more aspects of the present disclosure.

FIG. 5 is a block diagram illustrating a wireless network 50 having a network entity 105, a primary UE 115a, and a cooperative UE 115b, all such network nodes configured to support multi-path UE uplink communication techniques with UE cooperation according to one or more aspects of the present disclosure. Similar to wireless network 30 (FIG. 3), wireless network 50 includes primary UE 115a configured for uplink transmissions using a multi-path transmission configuration. Primary UE 115a may be configured by network entity 105, via control signaling (e.g., RRC signaling, MAC CE, DCI, etc.) to activate the multi-path transmission configuration, or may autonomously determine to activate the multi-path transmission configuration. Primary UE 115a maintains sidelink communications with cooperative UE 115b via the PC5 air interface. Cooperative UE 115b also maintains communications with network entity 105 via Uu air interface.

In one example implementation, as primary UE 115a autonomously determines to activate the multi-path transmission configuration, it transmits an activation request to network entity 105 via Uu air interface. Network entity 105 may then determine whether to grant the activation based on current channel conditions, current transmission loads, and the like. When network entity 105 determines to grant activation, it will transmit an activation signal to primary UE 115a via Uu air interface. Primary UE 115a then determines the activation of the multi-path transmission configuration.

As noted above, in order to accommodate the joint signaling of the various aspects proposed herein, new L1/L2 joint signaling formats may be defined. Multiple L1/L2 joint signaling formats may be configured by a network and provided in configuration messaging from network entity 105 to served UEs, such as primary UE 115a and cooperative UE 115b. Each L1/L2 joint signaling format may represent different combinations of uplink communications content. In one example implementation, L1 joint signaling formats for UCI messaging may include a UCI format 1 that may define a combination of BSR and PHR for the joint message payload; UCI format 2 may define a combination of BSR and BFR for the joint message payload, etc. Similarly, an example implementation of L2 joint signaling formats for MAC CE messaging may include MAC CE format 1 that may define a combination of BSR and PHR; MAC CE format 2 may define a combination of BFR and URLLC data, etc. Each L1/L2 joint signaling format may be associated with predefined report identifier (ID) and, for L1 joint signaling formats, may also be associated with predefined uplink resources.

Network entity 105 may configure primary UE 115a and cooperative UE 115b with multiple L1/L2 joint signaling formats. When the message format selection is determined by network entity 105, network entity 105 may transmit a dynamic selection signal, such as via MAC CE or DCI, that indicates to primary UE 115a and/or cooperative UE 115b which L1/L2 joint signaling format to use for upcoming uplink communications using the multi-path transmission configuration. In this manner, network entity 105 may indicate a switch between the multiple, available L1/L2 joint signaling formats at primary UE 115a or cooperative UE 115b.

The report ID may include a configuration ID for UCI-type L1 signaling and a logical channel ID (LCID) for MAC CE-type L2 signaling. Network entity 105 may use the decoded report ID to determine when multiple received signals represent the same uplink communication message received via the multi-path transmission configuration. As illustrated in FIG. 5, primary UE 115a generates a joint message 500, including a combination of uplink communications. Primary UE 115a selects the L1/L2 joint signaling format associated with the combination of communications that it selects. Primary UE 115a includes a report ID for joint message 500 that identifies the uplink communications. According to the illustrated aspect, primary UE 115a transmits joint message 500-direct to network entity 105 using the direct interface, Uu air interface. Primary UE 115a also transmits joint message 500-indirect, which is the same message with the same report ID of joint message 500-direct, to cooperative UE 115b using the PC5 air interface. In implementing the indirect path to network entity 105, cooperative UE 115b may retransmit joint message 500-indirect to network entity 105 using the direct interface, Uu air interface.

As network entity 105 receives the duplicate communications, joint message 500-direct and joint message 500-indirect, from the direct Uu air interface from primary UE 115a and from the "indirect" Uu air interface from cooperative UE 115b, network entity 105 may determine these received communications are duplicate by the report ID. As noted above, report ID may be the configuration ID when joint message 500 is configured using a UCI L1 joint signaling format, or as the LCID when joint message 500 is configured using a MAC CE L2 joint signaling format. Network entity 105 may then determine how to handle the duplicate messages. Network entity 105 may not process both messages. Thus, network entity 105 will discard all but one of the duplicate messages. For example, when joint message 500-direct and joint message 500-indirect are received at the same time, network entity 105 may randomly select one of those messages to discard. When joint message 500-direct and joint message 500-indirect are received at different times, network entity may discard the later-received message.

In additional to discarding duplicate messages, network entity 500 may further determine to signal one or both of primary UE 115a and cooperative UE 115b to disable the multi-path transmission configuration. In one example implementation, network entity may transmit L1/L2 deactivation signaling to primary UE 115a, either directly via the Uu air interface, or indirectly, via the Uu air interface with cooperative UE 115b, which may then retransmit the L1/L2 deactivation signaling to primary UE 115a via the sidelink, PC5 air interface. Upon receipt of the L1/L2 deactivation signaling, primary UE 115a may deactivate the multi-path transmission configuration. In another example implementation, network entity 105 may send the L1/L2 deactivation signaling on the interface that should deactivate. For example, network entity 105 may transmit the L1/L2 deactivation signaling via the direct, Uu air interface to primary UE 115a. Primary UE 115a may then stop transmitting the uplink communications via the direct, Uu air interface, but continue transmitting the uplink communications via the indirect line, through the PC5 air interface with cooperative UE 115b and its direct, Uu air interface with network entity 105. Alternatively, network entity 105 may transmit the L1/L2 deactivation signaling to cooperative UE 115*b* via the Uu air interface between network entity 105 and cooperative UE 115*b*. Cooperative UE 115*b* will then stop retransmitting the uplink communications received from primary UE 115*a*. Cooperative UE 115*b* may further transmit an indication via the sidelink PC5 air interface to primary UE 115*a* identifying the deactivation signaling from network entity 105.

In additional aspects of the present disclosure, network entity 105 may implicitly signal to deactivate multi-path transmissions configuration by transmitting feedback to primary UE 115*a* via the link or interface that network entity 105 wants to remain active. For example, when network entity 105 desires to deactivate the indirect path, network entity 105 may provide feedback, such as hybrid automatic repeat request (HARQ) feedback, or the like, to primary UE 115*a* via the direct, Uu air interface. Upon receiving this feedback, primary UE 115*a* would know to deactivate the multi-path transmission configuration and the indirect communication path via cooperative UE 115*b*. Alternatively, when network entity 105 wants to deactivate the direct interface, it may transmit the feedback indirectly, from network entity 105 to cooperative UE 115*b* via the Uu air interface, where cooperative UE 115*b* retransmits the feedback from network entity 105 to primary UE 115*a* via the sidelink, PC5 air interface. Receiving the feedback at primary UE 115*a* from cooperative UE 115*b*, primary UE 115*a* would know to deactivate the multi-path transmission configuration and use the indirect path for uplink communications to network entity 105 through cooperative UE 115*b* via sidelink, PC5 air interface and the Uu air interface between cooperative UE 115*b* and network entity 105.

As noted above, the multi-path transmission configuration may be activated and deactivated via L1 (e.g., UCI) or L2 (e.g., MAC CE) signaling. Network entity 105 may initiate the activation or deactivation by transmitting the activation/deactivation L1/L2 signaling to primary UE 115*a*. Primary UE 115*a* may also initiate activation/deactivation of the multi-path transmission configuration. For the UE-initiated aspects, primary UE 115*a* would transmit an activation/deactivation request to network entity 105 and then wait to activate or deactivate until network entity 105 would transmit an activation or deactivation signal. Activation/deactivation signaling may be performed before or during data transmission between primary UE 115*a* and network entity 105. Activation or deactivation of the multi-path transmission configuration may be determined according to various factors, such as a quality of service (QoS) requirement of the serving traffic (e.g., URLLC vs one of enhanced mobile broadband (eMBB) communications or massive machine type communication (mMTC)), power capacity or capability constraints of primary UE 115*a* and/or cooperative UE 115*b*, and the like.

It is noted that one or more blocks (or operations) described with reference to FIGS. 4A-4C may be combined with one or more blocks (or operations) described with reference to another of the figures. For example, one or more blocks (or operations) of FIG. 5 may be combined with one or more blocks (or operations) of FIG. 3. As another example, one or more blocks associated with FIGS. 4A-4C may be combined with one or more blocks (or operations) associated with FIGS. 1-3. Additionally, or alternatively, one or more operations described above with reference to FIGS. 1-3 may be combined with one or more operations described with reference to FIG. 6 or 7.

In one or more aspects, techniques for supporting multi-path UE uplink communication techniques with UE cooperation may include additional aspects, such as any single aspect or any combination of aspects described below or in connection with one or more other processes or devices described elsewhere herein. In a first aspect, supporting multi-path UE uplink communication techniques with UE cooperation may include an apparatus configured to determine activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity, to identify one or more uplink communication messages for transmission to the serving network entity, and to transmit the one or more uplink communication messages to the serving network entity according to the multipath transmission configuration, wherein the one or more uplink communication messages are transmitted one of separately or assembled into one or more joint uplink communication messages.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect the processor-readable code to cause the at least one processor to determine the activation of the multipath transmission configuration includes processor-readable code to cause the at least one processor to receive a multipath transmission activation signal from the serving network entity.

In a third aspect, alone or in combination with one or more of the first aspect or the second aspect, the processor-readable code to cause the at least one processor to determine the activation of the multipath transmission configuration includes processor-readable code to cause the at least one processor to identify an activation condition for the multipath transmission configuration. The activation condition includes one of a quality of service setting or a power constraint of the UE or the one or more cooperative UEs known to the UE, transmit an activation request to the serving network entity in response to the activation condition, and receive a multipath transmission activation signal from the network entity.

In a fourth aspect, alone or in combination with one or more of the first aspect through the third aspect, further including the processor-readable code, executable by the at least one processor, to cause the at least one processor to: receive a transmission timing configuration from the serving network entity. The transmission timing configuration includes one of one or more configured periodicities, when the uplink communications include periodic communications, or one or more triggering events, when the uplink communications include aperiodic communications.

In a fifth aspect, alone or in combination with one or more of the first aspect through the fourth aspect, further including the processor-readable code, executable by the at least one processor, to cause the at least one processor to: receive a dynamic selection message from the serving network entity. The dynamic selection messages identifies a periodicity from the one or more configured periodicities or a triggering event from the one or more triggering events.

In a sixth aspect, alone or in combination with one or more of the first aspect through the fifth aspect, further including the processor-readable code, executable by the at least one processor, to cause the at least one processor to: receive one or more joint messaging formats from the serving network entity; and assemble the one or more uplink communication messages into the one or more joint uplink communication messages according to a joint messaging format of the one or more joint messaging formats.

In a seventh aspect, alone or in combination with one or more of the first aspect through the sixth aspect, further including the processor-readable code, executable by the at least one processor, to cause the at least one processor to: receive a dynamic selection message from the serving network entity. The dynamic selection message identifies the joint messaging format from the one or more joint messaging formats.

In an eighth aspect, alone or in combination with one or more of the first aspect through the seventh aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a ninth aspect, alone or in combination with one or more of the first aspect through the eighth aspect, the MAC CE predefined combination of uplink communication messages is indicated by one of: a payload field within a joint MAC CE format of the plurality of MAC CE formats, or an indication field within a single MAC CE format of the plurality of MAC CE formats.

In a tenth aspect, alone or in combination with one or more of the first aspect through the ninth aspect, further including the processor-readable code, executable by the at least one processor, to cause the at least one processor to: determine deactivation of the multipath transmission configuration at the UE. The deactivation is determined according to one of a deactivation signal received from the serving network entity, or a deactivation condition identified by the UE.

In an eleventh aspect, alone or in combination with one or more of the first aspect through the tenth aspect, the deactivation condition includes one of a quality of service setting, or a power constraint of the UE or the one or more cooperative UEs known to the UE, or a feedback message received from the serving network entity via the direct air interface.

In a twelfth aspect, alone or in combination with one or more of the first aspect through the eleventh aspect, the processor-readable code to cause the at least one processor to determine deactivation of the multipath transmission configuration includes processor-readable code to cause the at least one processor to: identify the feedback message from the serving network entity, transmit a deactivation request to the serving network entity in response to the feedback message, and receive the deactivation signal from the serving network entity.

In one or more aspects, techniques for supporting multi-path UE uplink communication techniques with UE cooperation may include additional aspects, such as any single aspect or any combination of aspects described below or in connection with one or more other processes or devices described elsewhere herein. In a thirteenth aspect, supporting multi-path UE uplink communication techniques with UE cooperation may include an apparatus configured to receive an activation indication of a multipath transmission configuration from a primary UE in sidelink communications with the cooperative UE. The multipath transmission configuration defines retransmission of uplink communications received from the primary UE via a sidelink interface to a serving network entity via a direct air interface between the cooperative UE and the serving network entity. The apparatus is further configured to receive one or more uplink communication messages from the primary UE. The apparatus is further configured to retransmit the one or more uplink communication messages to the serving network entity via the direct air interface according to the multipath transmission configuration.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a fourteenth aspect, alone or in combination with the thirteenth aspect, further including the processor-readable code, executable by the at least one processor, to cause the at least one processor to: determine deactivation of the multipath transmission configuration at the cooperative UE. The deactivation is determined according to one of a feedback message received from the serving network entity via the direct air interface, or a deactivation indication received from the primary UE.

In a fifteenth aspect, alone or in combination with one or more of the thirteenth aspect or the fourteenth aspect, further including the processor-readable code, executable by the at least one processor, to cause the at least one processor to retransmit the feedback message received from the serving network entity to the primary UE.

In one or more aspects, techniques for supporting multi-path UE uplink communication techniques with UE cooperation may include additional aspects, such as any single aspect or any combination of aspects described below or in connection with one or more other processes or devices described elsewhere herein. In a sixteenth aspect, supporting multi-path UE uplink communication techniques with UE cooperation may include an apparatus configured to determine activation of a multipath transmission configuration at the UE. The multipath transmission configuration defines transmission of uplink communications by the UE to a serving network entity via a direct air interface between the UE and the serving network entity and via one or more indirect air interfaces. The one or more indirect air interfaces include one or more sidelink interfaces between the UE and one or more cooperative UEs and the direct air interface between each cooperative UE of the one or more cooperative UEs and the serving network entity. The apparatus is further configured to determine activation of a multipath transmission configuration at the UE. The multipath transmission configuration defines transmission of uplink communications by the UE to a serving network entity via a direct air interface between the UE and the serving network entity and via one or more indirect air interfaces. The one or more indirect air interfaces include one or more sidelink interfaces between the UE and one or more cooperative UEs and the direct air interface between each cooperative UE of the one or more cooperative UEs and the serving network entity. The apparatus is further configured to identify one or more uplink communication messages for transmission to the serving network entity. The apparatus is further configured to transmit the one or more uplink communication messages to the serving network entity according to the multipath transmission configuration. The one or more uplink communication messages are transmitted one of separately or assembled into one or more joint uplink communication messages.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a seventeenth aspect, alone or in combination with the sixteenth aspect, the determining the activation of the multipath transmission configuration includes receiving a multipath transmission activation signal from the serving network entity.

In an eighteenth aspect, alone or in combination with one or more of the sixteenth aspect or the seventeenth aspect, the determining the activation of the multipath transmission configuration includes identifying an activation condition for the multipath transmission configuration. The activation condition includes one of a quality of service setting or a power constraint of the UE or the one or more cooperative UEs known to the UE; transmitting an activation request to the serving network entity in response to the activation condition, and receiving a multipath transmission activation signal from the network entity.

In a nineteenth aspect, alone or in combination with one or more of the sixteenth aspect through the eighteenth aspect, further including receiving a transmission timing configuration from the serving network entity. The transmission timing configuration includes one of one or more configured periodicities, when the uplink communications include periodic communications, or one or more triggering events, when the uplink communications include aperiodic communications.

In a twentieth aspect, alone or in combination with one or more of the sixteenth aspect through the nineteenth aspect, including receiving a dynamic selection message from the serving network entity. The dynamic selection messages identifies a periodicity from the one or more configured periodicities or a triggering event from the one or more triggering events.

In a twenty-first aspect, alone or in combination with one or more of the sixteenth aspect through the twentieth aspect, further including receiving one or more joint messaging formats from the serving network entity, and assembling the one or more uplink communication messages into the one or more joint uplink communication messages according to a joint messaging format of the one or more joint messaging formats.

In a twenty-second aspect, alone or in combination with one or more of the sixteenth aspect through the twenty-first aspect, further including receiving a dynamic selection message from the serving network entity. The dynamic selection message identifies the joint messaging format from the one or more joint messaging formats.

In a twenty-third aspect, alone or in combination with one or more of the sixteenth aspect through the twenty-second aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a twenty-third aspect, alone or in combination with one or more of the sixteenth aspect through the twenty-second aspect, the MAC CE predefined combination of uplink communication messages is indicated by one of: a payload field within a joint MAC CE format of the plurality of MAC CE formats, or an indication field within a single MAC CE format of the plurality of MAC CE formats.

In a twenty-fifth aspect, alone or in combination with one or more of the sixteenth aspect through the twenty-fourth aspect, further including determining deactivation of the multipath transmission configuration at the UE. The deactivation is determined according to one of a deactivation signal received from the serving network entity, or a deactivation condition identified by the UE.

In a twenty-sixth aspect, alone or in combination with one or more of the sixteenth aspect through the twenty-fifth aspect, the deactivation condition includes one of a quality of service setting, or a power constraint of the UE or the one or more cooperative UEs known to the UE, or a feedback message received from the serving network entity via the direct air interface.

In a twenty-seventh aspect, alone or in combination with one or more of the sixteenth aspect through the twenty-sixth aspect, the determining the deactivation of the multipath transmission configuration includes identifying the feedback message from the serving network entity, transmitting a deactivation request to the serving network entity in response to the feedback message, and receiving the deactivation signal from the serving network entity.

In one or more aspects, techniques for supporting multi-path UE uplink communication techniques with UE cooperation may include additional aspects, such as any single aspect or any combination of aspects described below or in connection with one or more other processes or devices described elsewhere herein. In a twenty-eighth aspect, supporting multi-path UE uplink communication techniques with UE cooperation may include an apparatus configured to receive an activation indication of a multipath transmission configuration from a primary UE in sidelink communications with the cooperative UE. The multipath transmission configuration defines retransmission of uplink communications received from the primary UE via a sidelink interface to a serving network entity via a direct air interface between the cooperative UE and the serving network entity. The apparatus is further configured to receive one or more uplink communication messages from the primary UE. The apparatus is further configured to retransmit the one or more uplink communication messages to the serving network entity via the direct air interface according to the multipath transmission configuration.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-ninth aspect, alone or in combination with the twenty-eighth aspect, further including determining deactivation of the multipath transmission configuration at the cooperative UE. The deactivation is determined according to one of a feedback message received from the serving network entity via the direct air interface, or a deactivation indication received from the primary UE.

In a thirtieth aspect, alone or in combination with one or more of the twenty-eighth aspect or the twenty-ninth aspect, further including retransmitting the feedback message received from the serving network entity to the primary UE.

In one or more aspects, techniques for supporting multi-path UE uplink communication techniques with UE cooperation may include additional aspects, such as any single aspect or any combination of aspects described below or in connection with one or more other processes or devices described elsewhere herein. In a thirty-first aspect, supporting multi-path UE uplink communication techniques with UE cooperation may include an apparatus configured to means for determining activation of a multipath transmission configuration at the UE. The multipath transmission configuration defines transmission of uplink communications by the UE to a serving network entity via a direct air interface between the UE and the serving network entity and via one or more indirect air interfaces. The one or more indirect air interfaces include one or more sidelink interfaces between the UE and one or more cooperative UEs and the direct air interface between each cooperative UE of the one or more cooperative UEs and the serving network entity. The apparatus is further configured to means for identifying one or more uplink communication messages for transmission to the serving network entity. The apparatus is further configured to means for transmitting the one or more uplink communication messages to the serving network entity according to the multipath transmission configuration. The one or more uplink communication messages are transmitted one of separately or assembled into one or more joint uplink communication messages.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-second aspect, alone or in combination with the thirty-first aspect, wherein the means for determining the activation of the multipath transmission configuration includes means for receiving a multipath transmission activation signal from the serving network entity.

In a thirty-third aspect, alone or in combination with one or more of the thirty-first aspect or the thirty-second aspect, the means for determining the activation of the multipath transmission configuration includes means for identifying an activation condition for the multipath transmission configuration. The activation condition includes one of a quality of service setting or a power constraint of the UE or the one or more cooperative UEs known to the UE, means for transmitting an activation request to the serving network entity in response to the activation condition, and means for receiving a multipath transmission activation signal from the network entity.

In a thirty-fourth aspect, alone or in combination with one or more of the thirty-first aspect through the thirty-third aspect, further including means for receiving a transmission timing configuration from the serving network entity. The transmission timing configuration includes one of one or more configured periodicities, when the uplink communications include periodic communications, or one or more triggering events, when the uplink communications include aperiodic communications.

In a thirty-fifth aspect, alone or in combination with one or more of the thirty-first aspect through the thirty-fourth aspect, further including means for receiving a dynamic selection message from the serving network entity. The dynamic selection messages identifies a periodicity from the one or more configured periodicities or a triggering event from the one or more triggering events.

In a thirty-sixth aspect, alone or in combination with one or more of the thirty-first aspect through the thirty-fifth aspect, further including means for receiving one or more joint messaging formats from the serving network entity, and means for assembling the one or more uplink communication messages into the one or more joint uplink communication messages according to a joint messaging format of the one or more joint messaging formats.

In a thirty-seventh aspect, alone or in combination with one or more of the thirty-first aspect through the thirty-sixth aspect, further including means for receiving a dynamic selection message from the serving network entity. The dynamic selection message identifies the joint messaging format from the one or more joint messaging formats.

In a thirty-eighth aspect, alone or in combination with one or more of the thirty-first aspect through the thirty-seventh aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a thirty-ninth aspect, alone or in combination with one or more of the thirty-first aspect through the thirty-eighth aspect, the MAC CE predefined combination of uplink communication messages is indicated by one of a payload field within a joint MAC CE format of the plurality of MAC CE formats, or an indication field within a single MAC CE format of the plurality of MAC CE formats.

In a fortieth aspect, alone or in combination with one or more of the thirty-first aspect through the thirty-ninth aspect, further including means for determining deactivation of the multipath transmission configuration at the UE. The deactivation is determined according to one of a deactivation signal received from the serving network entity, or a deactivation condition identified by the UE.

In a forty-first aspect, alone or in combination with one or more of the thirty-first aspect through the fortieth aspect, the deactivation condition includes one of a quality of service setting, or a power constraint of the UE or the one or more cooperative UEs known to the UE, or a feedback message received from the serving network entity via the direct air interface.

In a forty-second aspect, alone or in combination with one or more of the thirty-first aspect through the forty-first aspect, the means for determining the deactivation of the multipath transmission configuration includes means for identifying the feedback message from the serving network entity, means for transmitting a deactivation request to the serving network entity in response to the feedback message, and means for receiving the deactivation signal from the serving network entity.

In one or more aspects, techniques for supporting multi-path UE uplink communication techniques with UE cooperation may include additional aspects, such as any single aspect or any combination of aspects described below or in connection with one or more other processes or devices described elsewhere herein. In a forty-third aspect, supporting multi-path UE uplink communication techniques with UE cooperation may include an apparatus configured to means for receiving an activation indication of a multipath transmission configuration from a primary UE in sidelink communications with the cooperative UE. The multipath transmission configuration defines retransmission of uplink communications received from the primary UE via a sidelink interface to a serving network entity via a direct air interface between the cooperative UE and the serving network entity. The apparatus is further configured to means for receiving one or more uplink communication messages from the primary UE. The apparatus is further configured to means for retransmitting the one or more uplink communication messages to the serving network entity via the direct air interface according to the multipath transmission configuration.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a forty-fourth aspect, alone or in combination with the forty-third aspect, further including means for determining deactivation of the multipath transmission configuration at the cooperative UE. The deactivation is determined according to one of: a feedback message received from the serving network entity via the direct air interface, or a deactivation indication received from the primary UE.

In a forty-fifth aspect, alone or in combination with one or more of the forty-third aspect through the forty-fourth aspect, further including means for retransmitting the feedback message received from the serving network entity to the primary UE.

In one or more aspects, techniques for supporting multi-path UE uplink communication techniques with UE cooperation may include additional aspects, such as any single aspect or any combination of aspects described below or in connection with one or more other processes or devices described elsewhere herein. In a forty-sixth aspect, supporting multi-path UE uplink communication techniques with UE cooperation may include an apparatus configured to determine activation of a multipath transmission configuration at the UE. The multipath transmission configuration defines transmission of uplink communications by the UE to a serving network entity via a direct air interface between the UE and the serving network entity and via one or more indirect air interfaces. The one or more indirect air interfaces include one or more sidelink interfaces between the UE and one or more cooperative UEs and the direct air interface between each cooperative UE of the one or more cooperative UEs and the serving network entity. The apparatus is further configured to identify one or more uplink communication messages for transmission to the serving network entity. The apparatus is further configured to transmit the one or more uplink communication messages to the serving network entity according to the multipath transmission configuration. The one or more uplink communication messages are transmitted one of separately or assembled into one or more joint uplink communication messages.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a forty-seventh aspect, alone or in combination with the forty-sixth aspect, wherein the instructions that, when executed by the processor, cause the processor to perform the determining the activation of the multipath transmission configuration includes the instructions that, when executed by the processor, cause the processor to perform receiving a multipath transmission activation signal from the serving network entity.

In a forty-eighth aspect, alone or in combination with one or more of the forty-sixth aspect or the forty-seventh aspect, the instructions that, when executed by the processor, cause the processor to perform the determining the activation of the multipath transmission configuration includes the instructions that, when executed by the processor, cause the processor to perform: identifying an activation condition for the multipath transmission configuration. The activation condition includes one of a quality of service setting or a power constraint of the UE or the one or more cooperative UEs known to the UE, transmitting an activation request to the serving network entity in response to the activation condition, and receiving a multipath transmission activation signal from the network entity.

In a forty-ninth aspect, alone or in combination with one or more of the forty-sixth aspect through the forty-eighth aspect, further including the instructions that, when executed by the processor, cause the processor to perform receiving a transmission timing configuration from the serving network entity. The transmission timing configuration includes one of one or more configured periodicities, when the uplink communications include periodic communications, or one or more triggering events, when the uplink communications include aperiodic communications.

In a fiftieth aspect, alone or in combination with one or more of the forty-sixth aspect through the forty-ninth aspect, further including the instructions that, when executed by the processor, cause the processor to perform: receiving a dynamic selection message from the serving network entity. The dynamic selection messages identifies a periodicity from the one or more configured periodicities or a triggering event from the one or more triggering events.

In a fifty-first aspect, alone or in combination with one or more of the forty-sixth aspect through the fiftieth aspect, further including the instructions that, when executed by the processor, cause the processor to perform: receiving one or more joint messaging formats from the serving network entity, and assembling the one or more uplink communication messages into the one or more joint uplink communication messages according to a joint messaging format of the one or more joint messaging formats.

In a fifty-second aspect, alone or in combination with one or more of the forty-sixth aspect through the fifty-first aspect, further including the instructions that, when executed by the processor, cause the processor to perform receiving a dynamic selection message from the serving network entity. The dynamic selection message identifies the joint messaging format from the one or more joint messaging formats.

In a fifty-third aspect, in combination with one or more of the forty-sixth aspect through the fifty-second aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a fifty-fourth aspect, alone or in combination with one or more of the forty-sixth aspect through the fifty-third aspect, the MAC CE predefined combination of uplink communication messages is indicated by one of a payload field within a joint MAC CE format of the plurality of MAC CE formats, or an indication field within a single MAC CE format of the plurality of MAC CE formats.

In a fifty-fifth aspect, alone or in combination with one or more of the forty-sixth aspect through the fifty-fourth aspect, further including the instructions that, when executed by the processor, cause the processor to perform determining deactivation of the multipath transmission configuration at the UE. The deactivation is determined according to one of: a deactivation signal received from the serving network entity, or a deactivation condition identified by the UE.

In a fifty-sixth aspect, alone or in combination with one or more of the forty-sixth aspect through the fifty-fifth aspect, the deactivation condition includes one of a quality of service setting, or a power constraint of the UE or the one or more cooperative UEs known to the UE, or a feedback message received from the serving network entity via the direct air interface.

In a fifty-seventh aspect, alone or in combination with one or more of the forty-sixth aspect through the fifty-sixth aspect, the instructions that, when executed by the processor, cause the processor to perform the determining the deactivation of the multipath transmission configuration includes the instructions that, when executed by the processor, cause the processor to perform identifying the feedback message from the serving network entity, transmitting a deactivation request to the serving network entity in response to the feedback message, and receiving the deactivation signal from the serving network entity.

In one or more aspects, techniques for supporting multi-path UE uplink communication techniques with UE cooperation may include additional aspects, such as any single aspect or any combination of aspects described below or in connection with one or more other processes or devices described elsewhere herein. In a fifty-eighth aspect, supporting multi-path UE uplink communication techniques with UE cooperation may include an apparatus configured to receive an activation indication of a multipath transmission configuration from a primary UE in sidelink communications with the cooperative UE. The multipath transmission configuration defines retransmission of uplink communications received from the primary UE via a sidelink interface to a serving network entity via a direct air interface between the cooperative UE and the serving network entity. The apparatus is further configured to receive one or more uplink communication messages from the primary UE. The apparatus is further configured to retransmit the one or more uplink communication messages to the serving network entity via the direct air interface according to the multipath transmission configuration.

Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a fifty-ninth aspect, alone or in combination with the fifty-eighth aspect, further including the instructions that, when executed by the processor, cause the processor to perform determining deactivation of the multipath transmission configuration at the cooperative UE. The deactivation is determined according to one of a feedback message received from the serving network entity via the direct air interface, or a deactivation indication received from the primary UE.

In a sixtieth aspect, alone or in combination with one or more of the fifty-eighth aspect or the fifty-ninth aspect, further including the instructions that, when executed by the processor, cause the processor to perform retransmitting the feedback message received from the serving network entity to the primary UE.

In one or more aspects, techniques for supporting multi-path UE uplink communication techniques with UE cooperation may include additional aspects, such as any single aspect or any combination of aspects described below or in connection with one or more other processes or devices described elsewhere herein. In a sixty-first aspect, supporting multi-path UE uplink communication techniques with UE cooperation may include a network entity configured to transmit an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, identify one or more duplicate uplink communication messages from a two or more uplink communication messages received at the network entity, and discard the one or more duplicate uplink communication messages.

Additionally, an apparatus may perform or operate according to one or more aspects as described below. In some implementations, the apparatus includes a wireless device, such as a network entity. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a sixty-second aspect, alone or in combination with the sixty-first aspect, wherein the processor-readable code to cause the at least one processor to identify the one or more duplicate uplink communication messages includes processor-readable code to cause the at least one processor to: decode a report identifier (ID) associated with each uplink communication message of the two or more uplink communication messages received at the network entity; and determine the one or more duplicate uplink communication messages in response to the report ID of the one or more duplicate uplink communication messages being a same report ID.

In a sixty-third aspect, in combination with one or more of the sixty-first aspect or the sixty-second aspect, further including the processor-readable code, executable by the at least one processor, to cause the at least one processor to: transmit, in response to the one or more duplicate uplink communication messages, a multipath transmission deactivation indication via one of the direct air interface or the one or more indirect interfaces over which the network entity received the one or more duplicate uplink communication messages.

In a sixty-fourth aspect, alone or in combination with one or more of the sixty-first aspect through the sixty-third aspect, the multipath transmission deactivation indication includes one of a deactivating signal to the primary UE, or a feedback signal associated with the one or more duplicate uplink communication messages to the primary UE or the one or more cooperative UEs.

In a sixty-fifth aspect, alone or in combination with one or more of the sixty-first aspect through the sixty-fourth aspect, further including the processor-readable code, executable by the at least one processor, to cause the at least one processor to transmit a transmission timing configuration to the primary UE. The transmission timing configuration includes one of one or more configured periodicities, when the uplink communications include periodic communications, or one or more triggering events, when the uplink communications include aperiodic communications.

In a sixty-sixth aspect, alone or in combination with one or more of the sixty-first aspect through the sixty-fifth aspect, further including the processor-readable code, executable by the at least one processor, to cause the at least one processor to: transmit a dynamic selection message to the primary UE. The dynamic selection messages identifies a periodicity from the one or more configured periodicities or a triggering event from the one or more triggering events.

In a sixty-seventh aspect, alone or in combination with one or more of the sixty-first aspect through the sixty-sixth aspect, further including the processor-readable code, executable by the at least one processor, to cause the at least one processor to: transmit one or more joint messaging formats to the primary UE. The one or more uplink communication messages are formatted according to a joint messaging format of the one or more joint messaging formats.

In a sixty-eighth aspect, alone or in combination with one or more of the sixty-first aspect through the sixty-seventh aspect, further including the processor-readable code, executable by the at least one processor, to cause the at least one processor to transmit a dynamic selection message to the primary UE. The dynamic selection message identifies the joint messaging format from the one or more joint messaging formats.

In a sixty-ninth aspect, alone or in combination with one or more of the sixty-first aspect through the sixty-eighth aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a seventieth aspect, alone or in combination with one or more of the sixty-first aspect through the sixty-ninth aspect, the MAC CE predefined combination of uplink communication messages is indicated by one of a payload field within a joint MAC CE format of the plurality of MAC CE formats, or an indication field within a single MAC CE format of the plurality of MAC CE formats.

In one or more aspects, techniques for supporting multi-path UE uplink communication techniques with UE cooperation may include additional aspects, such as any single aspect or any combination of aspects described below or in connection with one or more other processes or devices described elsewhere herein. In a seventy-first aspect, supporting multi-path UE uplink communication techniques with UE cooperation may include a network entity configured to transmit an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, identify one or more duplicate uplink communication messages from a two or more uplink communication messages received at the network entity, and discard the one or more duplicate uplink communication messages.

Additionally, an apparatus may perform or operate according to one or more aspects as described below. In some implementations, the apparatus includes a wireless device, such as a network entity. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a seventy-second aspect, alone or in combination with the seventy-first aspect, wherein the identifying the one or more duplicate uplink communication messages includes decoding a report identifier (ID) associated with each uplink communication message of the two or more uplink communication messages received at the network entity, and determining the one or more duplicate uplink communication messages in response to the report ID of the one or more duplicate uplink communication messages being a same report ID.

In a seventy-third aspect, alone or in combination with one or more of the seventy-first aspect or the seventy-second aspect, further including transmitting, in response to the one or more duplicate uplink communication messages, a multipath transmission deactivation indication via one of the direct air interface or the one or more indirect interfaces over which the network entity received the one or more duplicate uplink communication messages.

In a seventy-fourth aspect, alone or in combination with one or more of the seventy-first aspect through the seventy-third aspect, the multipath transmission deactivation indication includes one of a deactivating signal to the primary UE, or a feedback signal associated with the one or more duplicate uplink communication messages to the primary UE or the one or more cooperative UEs.

In a seventy-fifth aspect, alone or in combination with one or more of the seventy-first aspect through the seventy-fourth aspect, further including transmitting a transmission timing configuration to the primary UE. The transmission timing configuration includes one of one or more configured periodicities, when the uplink communications include periodic communications, or one or more triggering events, when the uplink communications include aperiodic communications.

In a seventy-sixth aspect, alone or in combination with one or more of the seventy-first aspect through the seventy-fifth aspect, further including transmitting a dynamic selection message to the primary UE. The dynamic selection messages identifies a periodicity from the one or more configured periodicities or a triggering event from the one or more triggering events.

In a seventy-seventh aspect, alone or in combination with one or more of the seventy-first aspect through the seventy-sixth aspect, further including transmitting one or more joint messaging formats to the primary UE. The one or more uplink communication messages are formatted according to a joint messaging format of the one or more joint messaging formats.

In a seventy-eighth aspect, alone or in combination with one or more of the seventy-first aspect through the seventy-seventh aspect, further including: transmitting a dynamic selection message to the primary UE. The dynamic selection message identifies the joint messaging format from the one or more joint messaging formats.

In a seventy-ninth aspect, alone or in combination with one or more of the seventy-first aspect through the seventy-eighth aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a eightieth aspect, alone or in combination with one or more of the seventy-first aspect through the seventy-ninth aspect the MAC CE predefined combination of uplink communication messages is indicated by one of a payload field within a joint MAC CE format of the plurality of MAC CE formats, or an indication field within a single MAC CE format of the plurality of MAC CE formats.

In one or more aspects, techniques for supporting multi-path UE uplink communication techniques with UE cooperation may include additional aspects, such as any single aspect or any combination of aspects described below or in connection with one or more other processes or devices described elsewhere herein. In a eighty-first aspect, supporting multi-path UE uplink communication techniques with UE cooperation may include a network entity configured to transmit an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, identify one or more duplicate uplink communication messages from a two or more uplink communication messages received at the network entity, and discard the one or more duplicate uplink communication messages.

Additionally, an apparatus may perform or operate according to one or more aspects as described below. In some implementations, the apparatus includes a wireless device, such as a network entity. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a eighty-second aspect, alone or in combination with the eighty-first aspect, wherein the means for identifying the one or more duplicate uplink communication messages includes means for decoding a report identifier (ID) associated with each uplink communication message of the two or more uplink communication messages received at the network entity, and means for determining the one or more duplicate uplink communication messages in response to the report ID of the one or more duplicate uplink communication messages being a same report ID.

In a eighty-third aspect, alone or in combination with one or more of the eighty-first aspect through the eighty-second aspect, further including means for transmitting, in response to the one or more duplicate uplink communication messages, a multipath transmission deactivation indication via one of the direct air interface or the one or more indirect interfaces over which the network entity received the one or more duplicate uplink communication messages.

In a eighty-fourth aspect, alone or in combination with one or more of the eighty-first aspect through the eighty-third aspect, the multipath transmission deactivation indication includes one of a deactivating signal to the primary UE, or a feedback signal associated with the one or more duplicate uplink communication messages to the primary UE or the one or more cooperative UEs.

In a eighty-fifth aspect, alone or in combination with one or more of the eighty-first aspect through the eighty-fourth aspect, further including means for transmitting a transmission timing configuration to the primary UE. The transmission timing configuration includes one of one or more configured periodicities, when the uplink communications include periodic communications, or one or more triggering events, when the uplink communications include aperiodic communications.

In a eighty-sixth aspect, alone or in combination with one or more of the eighty-first aspect through the eighty-fifth aspect, further including means for transmitting a dynamic selection message to the primary UE. The dynamic selection messages identifies a periodicity from the one or more configured periodicities or a triggering event from the one or more triggering events.

In a eighty-seventh aspect, alone or in combination with one or more of the eighty-first aspect through the eighty-sixth aspect, further including means for transmitting one or more joint messaging formats to the primary UE. The one or more uplink communication messages are formatted according to a joint messaging format of the one or more joint messaging formats.

In a eighty-eighth aspect, alone or in combination with one or more of the eighty-first aspect through the eighty-seventh aspect, further including means for transmitting a dynamic selection message to the primary UE. The dynamic selection message identifies the joint messaging format from the one or more joint messaging formats.

In a eighty-ninth aspect, alone or in combination with one or more of the eighty-first through the eighty-eighth aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a ninetieth aspect, alone or in combination with one or more of the eighty-eighth aspect or the eighty-ninth aspect, the MAC CE predefined combination of uplink communication messages is indicated by one of: a payload field within a joint MAC CE format of the plurality of MAC CE formats, or an indication field within a single MAC CE format of the plurality of MAC CE formats.

In one or more aspects, techniques for supporting multi-path UE uplink communication techniques with UE cooperation may include additional aspects, such as any single aspect or any combination of aspects described below or in connection with one or more other processes or devices described elsewhere herein. In a ninety-first aspect, supporting multi-path UE uplink communication techniques with UE cooperation may include a network entity configured to transmit an activation signal to a primary UE, wherein the activation signal activates a multipath transmission configuration at the primary UE which defines transmission of uplink communications by the primary UE via a direct air interface between the primary UE and the network entity and via one or more indirect interfaces between the primary UE, one or more cooperative UEs, and the network entity, identify one or more duplicate uplink communication messages from a two or more uplink communication messages received at the network entity, and discard the one or more duplicate uplink communication messages.

Additionally, an apparatus may perform or operate according to one or more aspects as described below. In some implementations, the apparatus includes a wireless device, such as a network entity. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a ninety-second aspect, alone or in combination with the ninety-first aspect, wherein the instructions that, when executed by the processor, cause the processor to perform the identifying the one or more duplicate uplink communication messages includes the instructions that, when executed by the processor, cause the processor to perform, decoding a report identifier (ID) associated with each uplink communication message of the two or more uplink communication messages received at the network entity, and determining the one or more duplicate uplink communication messages in response to the report ID of the one or more duplicate uplink communication messages being a same report ID.

In a ninety-third aspect, alone or in combination with one or more of the ninety-first aspect or the ninety-second aspect, further including the instructions that, when executed by the processor, cause the processor to perform transmitting, in response to the one or more duplicate uplink communication messages, a multipath transmission deactivation indication via one of the direct air interface or the one or more indirect interfaces over which the network entity received the one or more duplicate uplink communication messages.

In a ninety-fourth aspect, alone or in combination with one or more of the ninety-first aspect through the ninety-third aspect, the multipath transmission deactivation indication includes one of: a deactivating signal to the primary UE, or a feedback signal associated with the one or more duplicate uplink communication messages to the primary UE or the one or more cooperative UEs.

In a ninety-fifth aspect, alone or in combination with one or more of the ninety-first aspect through the ninety-fourth aspect, further including the instructions that, when executed by the processor, cause the processor to perform: transmitting a transmission timing configuration to the primary UE. The transmission timing configuration includes one of one or more configured periodicities, when the uplink communications include periodic communications, or one or more triggering events, when the uplink communications include aperiodic communications.

In a ninety-sixth aspect, alone or in combination with one or more of the ninety-first aspect through the ninety-fifth aspect, further including the instructions that, when executed by the processor, cause the processor to perform transmitting a dynamic selection message to the primary UE. The dynamic selection messages identifies a periodicity from the one or more configured periodicities or a triggering event from the one or more triggering events.

In a ninety-seventh aspect, alone or in combination with one or more of the ninety-first aspect through the ninety-sixth aspect, further including the instructions that, when executed by the processor, cause the processor to perform transmitting one or more joint messaging formats to the primary UE. The one or more uplink communication messages are formatted according to a joint messaging format of the one or more joint messaging formats.

In a ninety-eighth aspect, alone or in combination with one or more of the ninety-first aspect through the ninety-seventh aspect, further including the instructions that, when executed by the processor, cause the processor to perform: transmitting a dynamic selection message to the primary UE. The dynamic selection message identifies the joint messaging format from the one or more joint messaging formats.

In a ninety-ninth aspect, alone or in combination with one or more of the ninety-first aspect through the ninety-eighth aspect, the one or more joint messaging formats include a plurality of uplink control information (UCI) formats or a plurality of medium access control-control element (MAC CE) formats. Each UCI format of the plurality of UCI formats is associated with a UCI predefined combination of uplink communication messages, a configuration identifier (ID), and a predetermined set of uplink resources. Each MAC CE format of the plurality of MAC CE formats is associated with a MAC CE predefined combination of uplink communication messages and a logical channel ID (LCID).

In a one-hundredth aspect, in combination with one or more of the ninety-first aspect through the ninety-ninth aspect, the MAC CE predefined combination of uplink communication messages is indicated by one of: a payload field within a joint MAC CE format of the plurality of MAC CE formats, or an indication field within a single MAC CE format of the plurality of MAC CE formats.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
   a memory storing processor-readable code; and
   at least one processor coupled to the memory, the at least one processor configured to execute the processor-readable code to cause the at least one processor to:
      determine activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity;
      identify one or more uplink communication messages for transmission to the serving network entity; and
      transmit the one or more uplink communication messages to the serving network entity according to the multipath transmission configuration, wherein the one or more uplink communication messages are transmitted one of separately or assembled into one or more joint uplink communication messages, wherein the multipath transmission configuration is based at least in part on an activation condition for the multipath transmission configuration, the activation condition including one of: a quality of service setting or a power constraint of the UE or the one or more cooperative UEs known to the UE.

2. The UE of claim 1, wherein the processor-readable code to cause the at least one processor to determine the activation of the multipath transmission configuration includes processor-readable code to cause the at least one processor to:
   receive a multipath transmission activation signal from the serving network entity.

3. The UE of claim 1, wherein the processor-readable code to cause the at least one processor to determine the activation of the multipath transmission configuration includes processor-readable code to cause the at least one processor to:
   identify the activation condition;
   transmit an activation request to the serving network entity in response to the activation condition; and
   receive a multipath transmission activation signal from the network entity.

4. The UE of claim 1, further including the processor-readable code, executable by the at least one processor, to cause the at least one processor to:
   receive a transmission timing configuration from the serving network entity, wherein the transmission timing configuration includes one of one or more configured periodicities, when the uplink communications include periodic communications, or one or more triggering events, when the uplink communications include aperiodic communications.

5. The UE of claim 4, further including the processor-readable code, executable by the at least one processor, to cause the at least one processor to:
   receive a dynamic selection message from the serving network entity, wherein the dynamic selection messages identifies a periodicity from the one or more configured periodicities or a triggering event from the one or more triggering events.

6. The UE of claim 1, further including the processor-readable code, executable by the at least one processor, to cause the at least one processor to:
   receive one or more joint messaging formats from the serving network entity; and
   assemble the one or more uplink communication messages into the one or more joint uplink communication messages according to a joint messaging format of the one or more joint messaging formats.

7. The UE of claim 6, further including the processor-readable code, executable by the at least one processor, to cause the at least one processor to:
   receive a dynamic selection message from the serving network entity, wherein the dynamic selection message identifies the joint messaging format from the one or more joint messaging formats.

8. The UE of claim 6,
   wherein the one or more joint messaging formats include a plurality of uplink control information (UCI) formats or a plurality of medium access control-control element (MAC CE) formats,
   wherein each UCI format of the plurality of UCI formats is associated with a UCI predefined combination of uplink communication messages, a configuration identifier (ID), and a predetermined set of uplink resources,
   wherein each MAC CE format of the plurality of MAC CE formats is associated with a MAC CE predefined combination of uplink communication messages and a logical channel ID (LCID).

9. The UE of claim 8, wherein the MAC CE predefined combination of uplink communication messages is indicated by one of:
   a payload field within a joint MAC CE format of the plurality of MAC CE formats, or
   an indication field within a single MAC CE format of the plurality of MAC CE formats.

10. The UE of claim 1, further including the processor-readable code, executable by the at least one processor, to cause the at least one processor to:
    determine deactivation of the multipath transmission configuration at the UE, wherein the deactivation is determined according to one of:
       a deactivation signal received from the serving network entity, or
       a deactivation condition identified by the UE.

11. The UE of claim 10, wherein the deactivation condition includes one of:
 the quality of service setting, or
 the power constraint of the UE or the one or more cooperative UEs known to the UE, or
 a feedback message received from the serving network entity via the direct air interface.

12. The UE of claim 11, wherein the processor-readable code to cause the at least one processor to determine deactivation of the multipath transmission configuration includes processor-readable code to cause the at least one processor to:
 identify the feedback message from the serving network entity;
 transmit a deactivation request to the serving network entity in response to the feedback message; and
 receive the deactivation signal from the serving network entity.

13. A method of wireless communication performed by a user equipment (UE), the method comprising:
 determining activation of a multipath transmission configuration at the UE, wherein the multipath transmission configuration defines transmission of uplink communications by the UE to a serving network entity via a direct air interface between the UE and the serving network entity and via one or more indirect air interfaces, wherein the one or more indirect air interfaces include one or more sidelink interfaces between the UE and one or more cooperative UEs and the direct air interface between each cooperative UE of the one or more cooperative UEs and the serving network entity;
 identifying one or more uplink communication messages for transmission to the serving network entity; and
 transmitting the one or more uplink communication messages to the serving network entity according to the multipath transmission configuration, wherein the one or more uplink communication messages are transmitted one of separately or assembled into one or more joint uplink communication messages, wherein the multipath transmission configuration is based at least in part on an activation condition for the multipath transmission configuration, the activation condition including one of: a quality of service setting or a power constraint of the UE or the one or more cooperative UEs known to the UE.

14. The method of claim 13, wherein the determining the activation of the multipath transmission configuration includes receiving a multipath transmission activation signal from the serving network entity.

15. The method of claim 13, wherein the determining the activation of the multipath transmission configuration includes:
 identifying the activation condition;
 transmitting an activation request to the serving network entity in response to the activation condition; and
 receiving a multipath transmission activation signal from the network entity.

16. The method of claim 13, further including:
 receiving a transmission timing configuration from the serving network entity, wherein the transmission timing configuration includes one of one or more configured periodicities, when the uplink communications include periodic communications, or one or more triggering events, when the uplink communications include aperiodic communications.

17. The method of claim 13, further including:
 determining deactivation of the multipath transmission configuration at the UE, wherein the deactivation is determined according to one of:
 a deactivation signal received from the serving network entity, or
 a deactivation condition identified by the UE.

* * * * *